United States Patent
Hinterbichler et al.

(10) Patent No.: US 10,255,292 B2
(45) Date of Patent: Apr. 9, 2019

(54) VIRTUAL-LOG-FILE METHOD AND SYSTEM

(71) Applicant: VMware, Inc., Palo Alto, CA (US)

(72) Inventors: Erik Hinterbichler, Palo Alto, CA (US); Ron Oded Gery, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 793 days.

(21) Appl. No.: 14/660,818

(22) Filed: Mar. 17, 2015

(65) Prior Publication Data

US 2016/0275101 A1 Sep. 22, 2016

(51) Int. Cl.
*G06F 17/30* (2006.01)

(52) U.S. Cl.
CPC .. *G06F 17/30233* (2013.01); *G06F 17/30126* (2013.01); *G06F 17/30144* (2013.01)

(58) Field of Classification Search
CPC ......... G06F 17/30233; G06F 17/30126; G06F 17/30144
USPC ........................................................ 707/822
See application file for complete search history.

(56) References Cited

U.S. PATENT DOCUMENTS

| | | | |
|---|---|---|---|
| 9,626,328 B1* | 4/2017 | Kumar | G06F 15/163 |
| 2009/0024911 A1* | 1/2009 | Margolis | G06T 11/206 715/215 |
| 2014/0081983 A1* | 3/2014 | Smith | G06F 11/3476 707/741 |

* cited by examiner

Primary Examiner — Pierre M Vital
Assistant Examiner — Alicia M Antoine

(57) ABSTRACT

The current document is directed to a virtual-log-file system that provides a browser-like display interface to users, enabling users to view the contents of log files. The virtual-log-file system assembles a virtual log file from the contents of one or more physical log files, applying filters and other processing to physical-log-file entries in order to generate the virtual-log-file entries logically contained within the virtual log file. The virtual-log-file system allows users to navigate, by scrolling, through the entries of the virtual log file, with additional virtual-log-file entries obtained from physical log files by the virtual-log-file system to support logical infinite scrolling in either direction. In addition, the virtual-log-file system provides for user selection of particular virtual-log-file entries as anchors that represent positions within the sequence of virtual-file-log entries, allowing a user to mark the anchor entries to facilitate visual recognition and to quickly navigate back to anchor entries after scrolling away from the anchor entries.

19 Claims, 41 Drawing Sheets

⋮

1202  1208  1210
         ⋮

2013-12-02T10:44:24.095Z li-qe-esx5.vmware.com Rhttpproxy:
[28959B90 verbose 'Proxy Req 46691'] Connected to
localhost:8307 ——— 1212                    ⟵ 1206

2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59

2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'

2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)

2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction

Log File

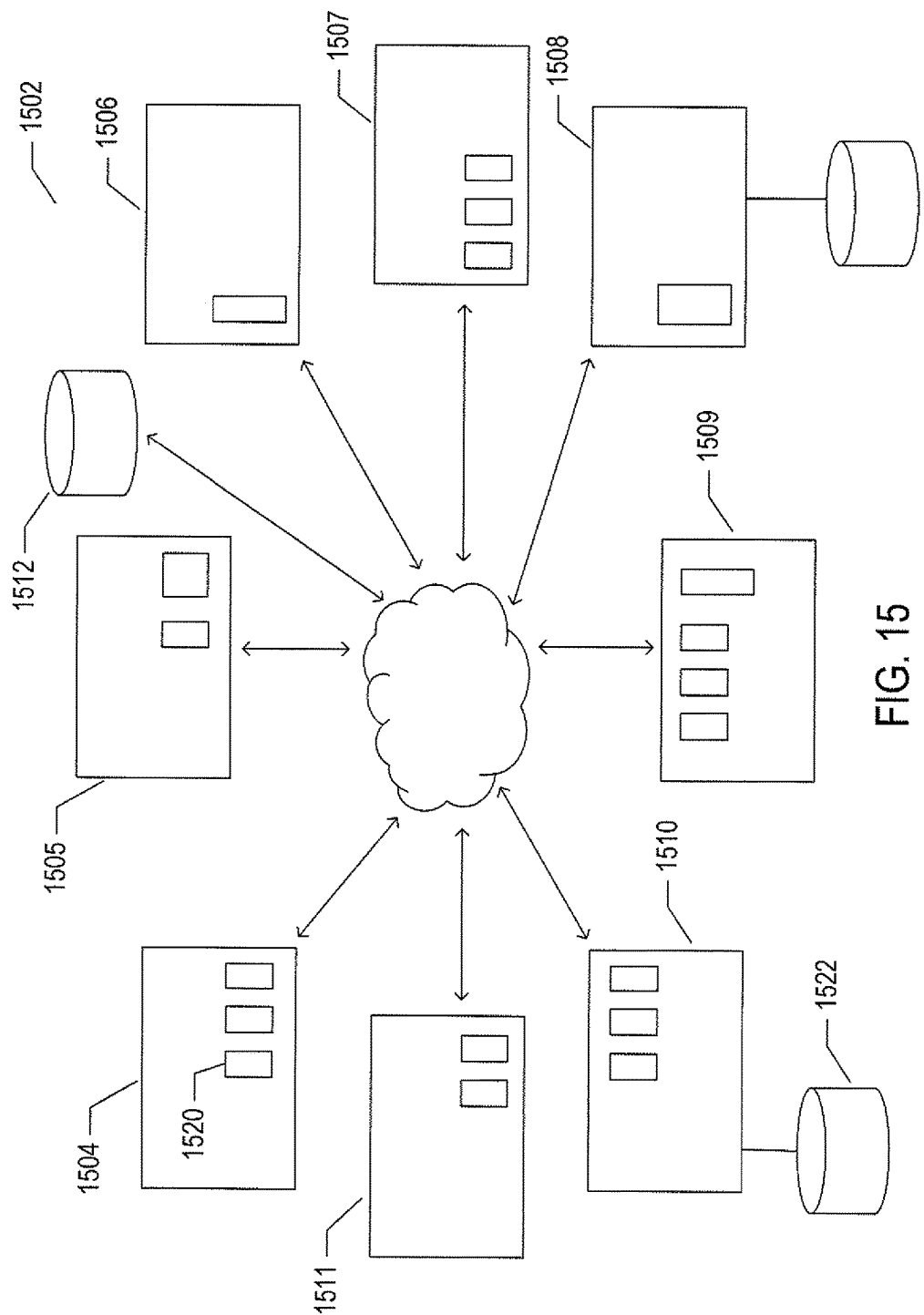

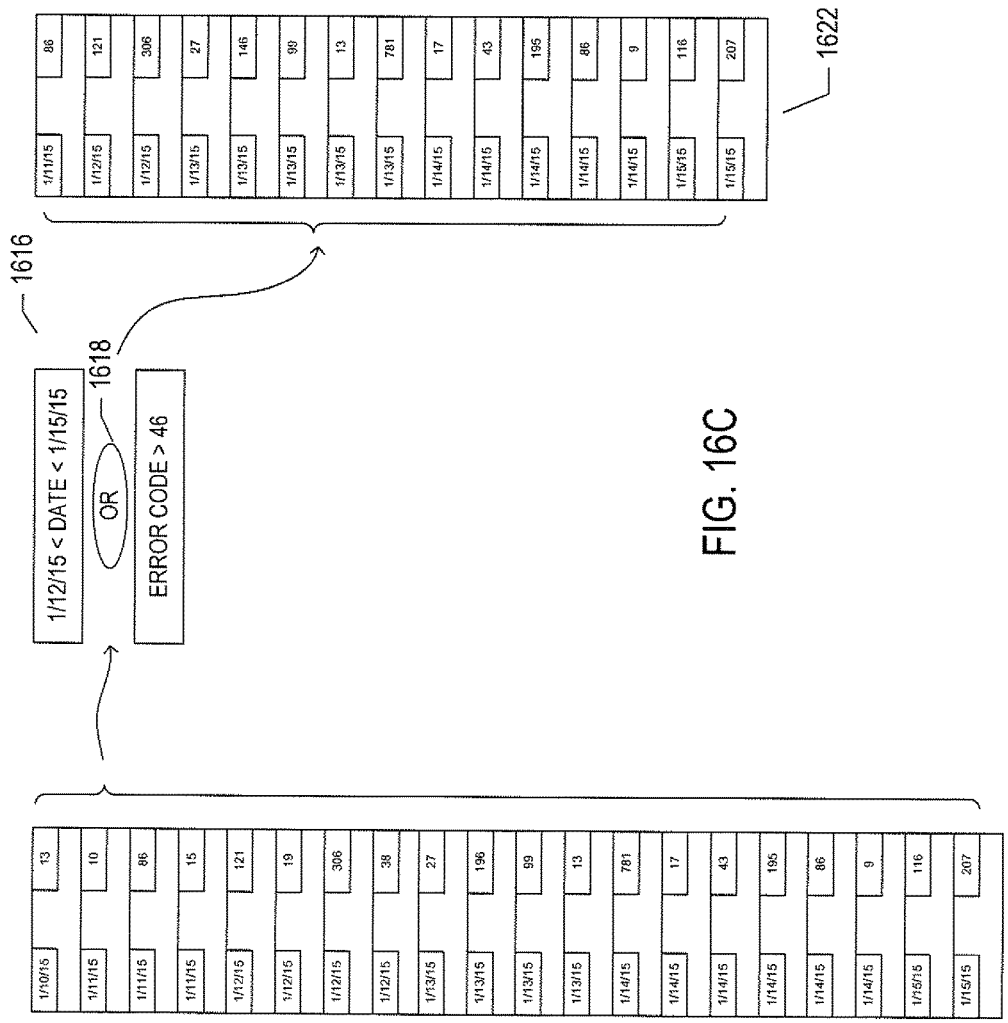

FIG. 19B

VIRTUAL-LOG-FILE METHOD AND SYSTEM

TECHNICAL FIELD

The current document is directed to event logging and log files and, in particular, to a virtual-log-file system, and methods incorporated in the virtual-log-file system, that allows a user to access the contents of one or more log files.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. It has proved to be a challenging task for system administrators, system designers and developers, and system users to identify information within the enormous event logs generated in distributed computing systems relevant to detecting and diagnosing operational anomalies and useful in administering, managing, and maintaining distributed computer systems.

SUMMARY

The current document is directed to a virtual-log-file system that provides a browser-like display interface to users, enabling users to view the contents of log files. The virtual-log-file system assembles a virtual log file from the contents of one or more physical log files, applying filters and other processing to physical-log-file entries in order to generate the virtual-log-file entries logically contained within the virtual log file. The virtual-log-file system allows users to navigate, by scrolling, through the entries of the virtual log file, with additional virtual-log-file entries obtained from physical log files by the virtual-log-file system to support logical infinite scrolling in either direction. In addition, the virtual-log-file system provides for user selection of particular virtual-log-file entries as anchors that represent positions within the sequence of virtual-file-log entries, allowing a user to mark the anchor entries to facilitate visual recognition and to quickly navigate back to anchor entries after scrolling away from the anchor entries.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIG. 15 illustrates the currently disclosed virtual-log-file system used to view the contents of current log files and, in certain cases, archived log files distributed throughout a large distributed computer system.

FIGS. 16A-C illustrate log-file-entry filtering.

FIGS. 19A-B show screen-shot-like illustrations of virtual-log-file displays provided by an implemented virtual-log-file system.

DETAILED DESCRIPTION

Figure 1:
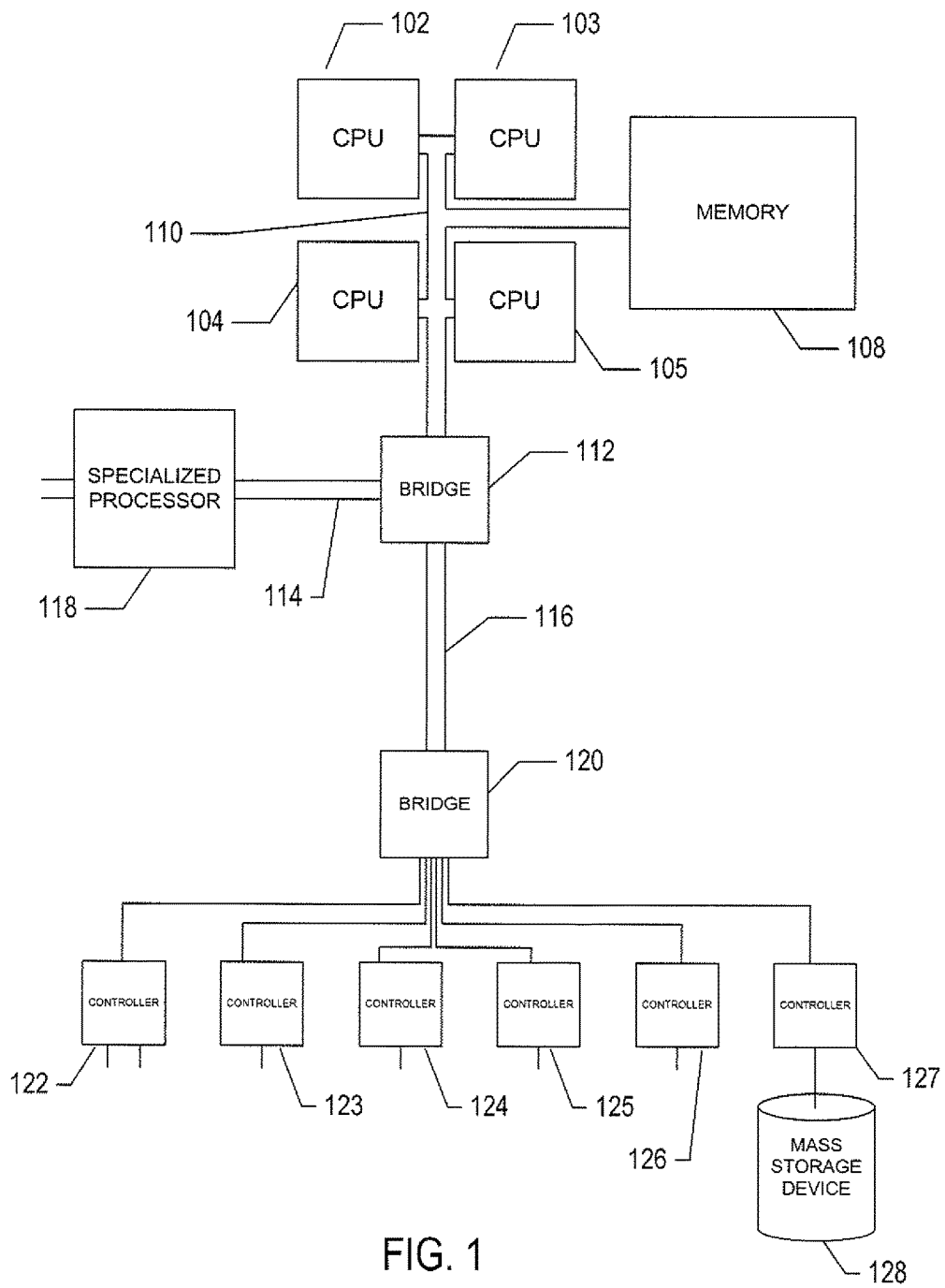
FIG. 1 provides a general architectural diagram for various types of computers.

The current document is direct to a virtual-log-file system, and methods incorporated within the virtual-log-file system, that provide for convenient and logical display of log-file entries to a user. In a first subsection, below, a detailed description of computer hardware, complex computational systems, and virtualization is provided with reference to FIGS. 1-10. In a second subsection, the virtual-log-file system is described and an implementation of the virtual-log-file system is discussed with reference to FIGS. 11-22J.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
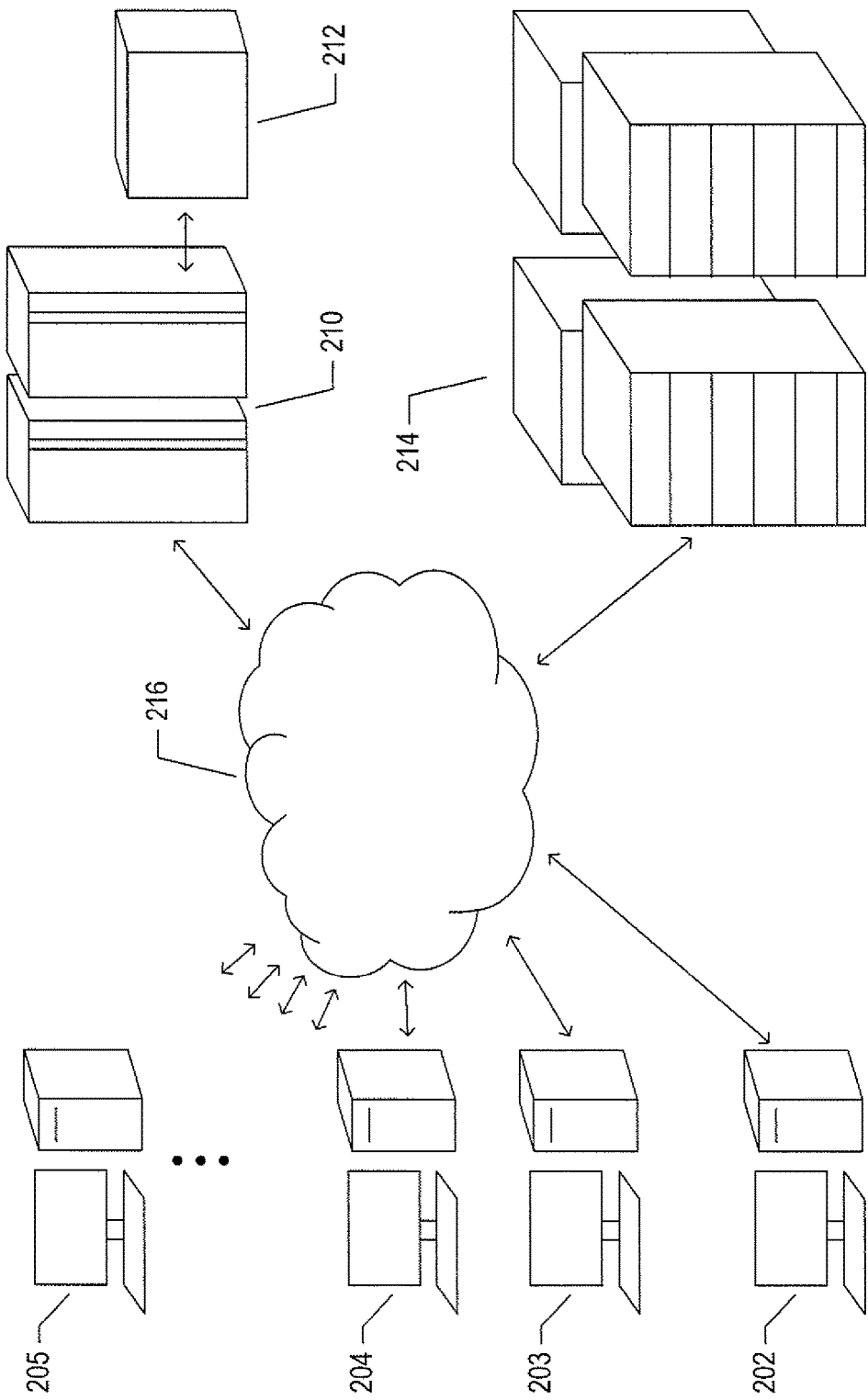
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
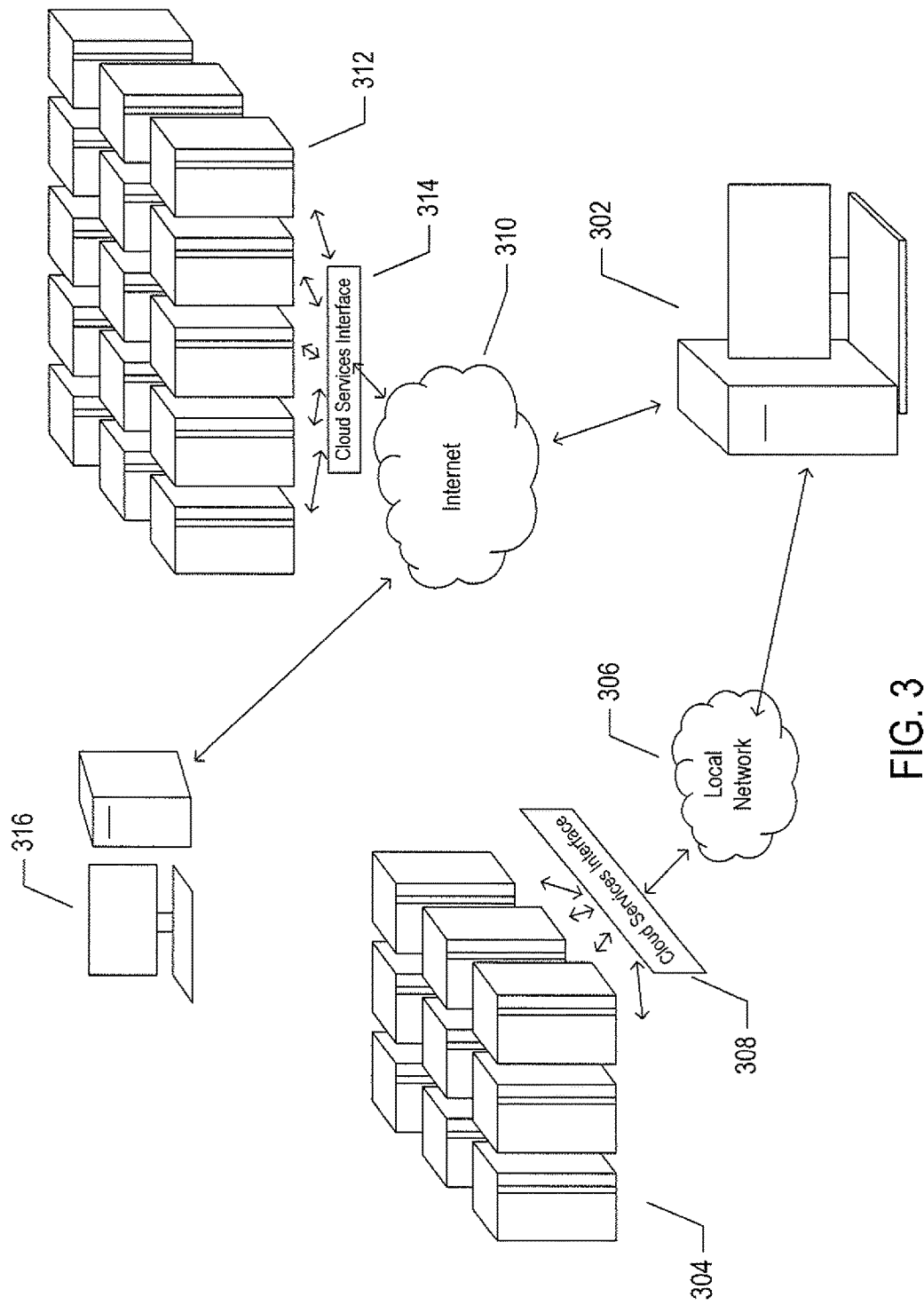
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
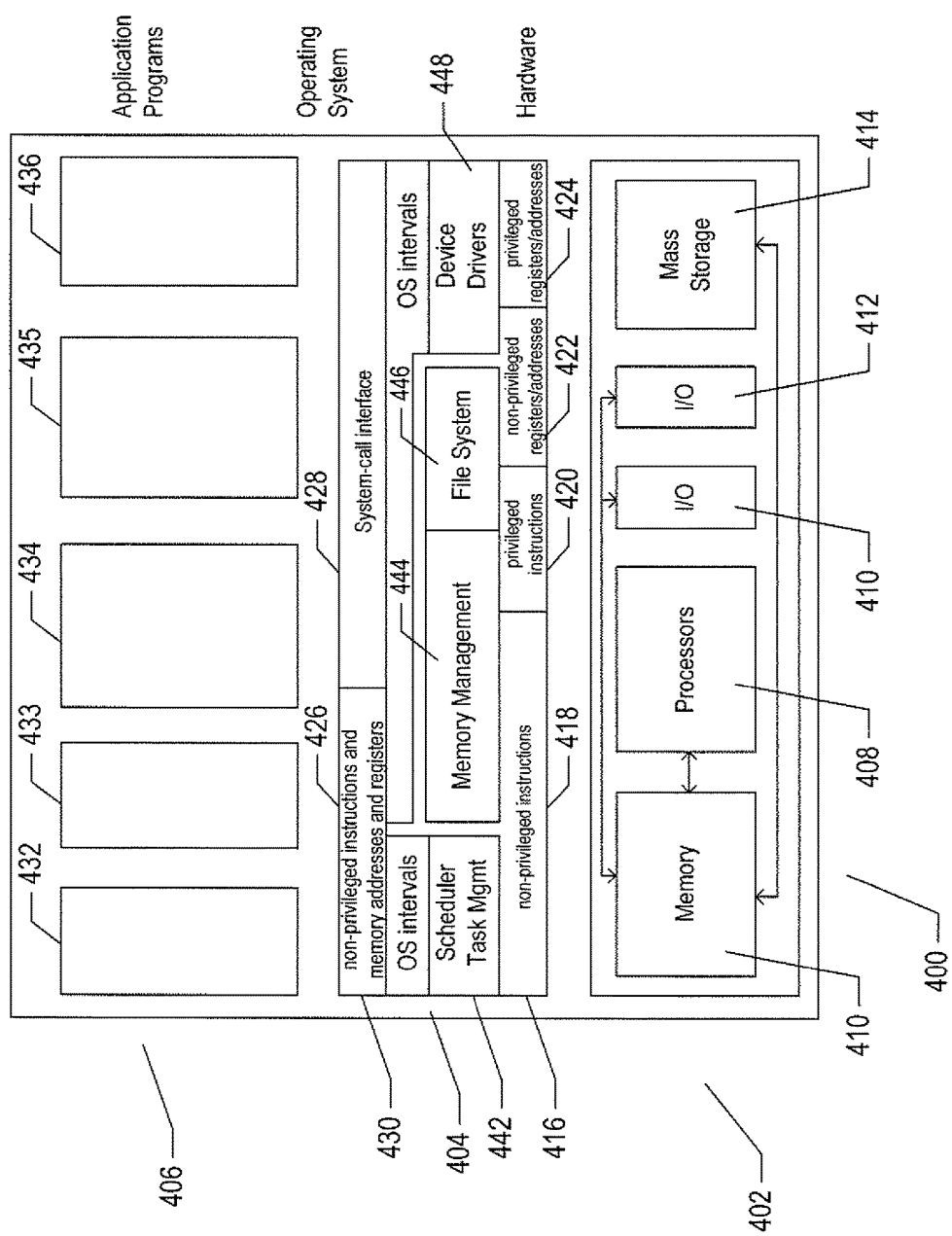
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
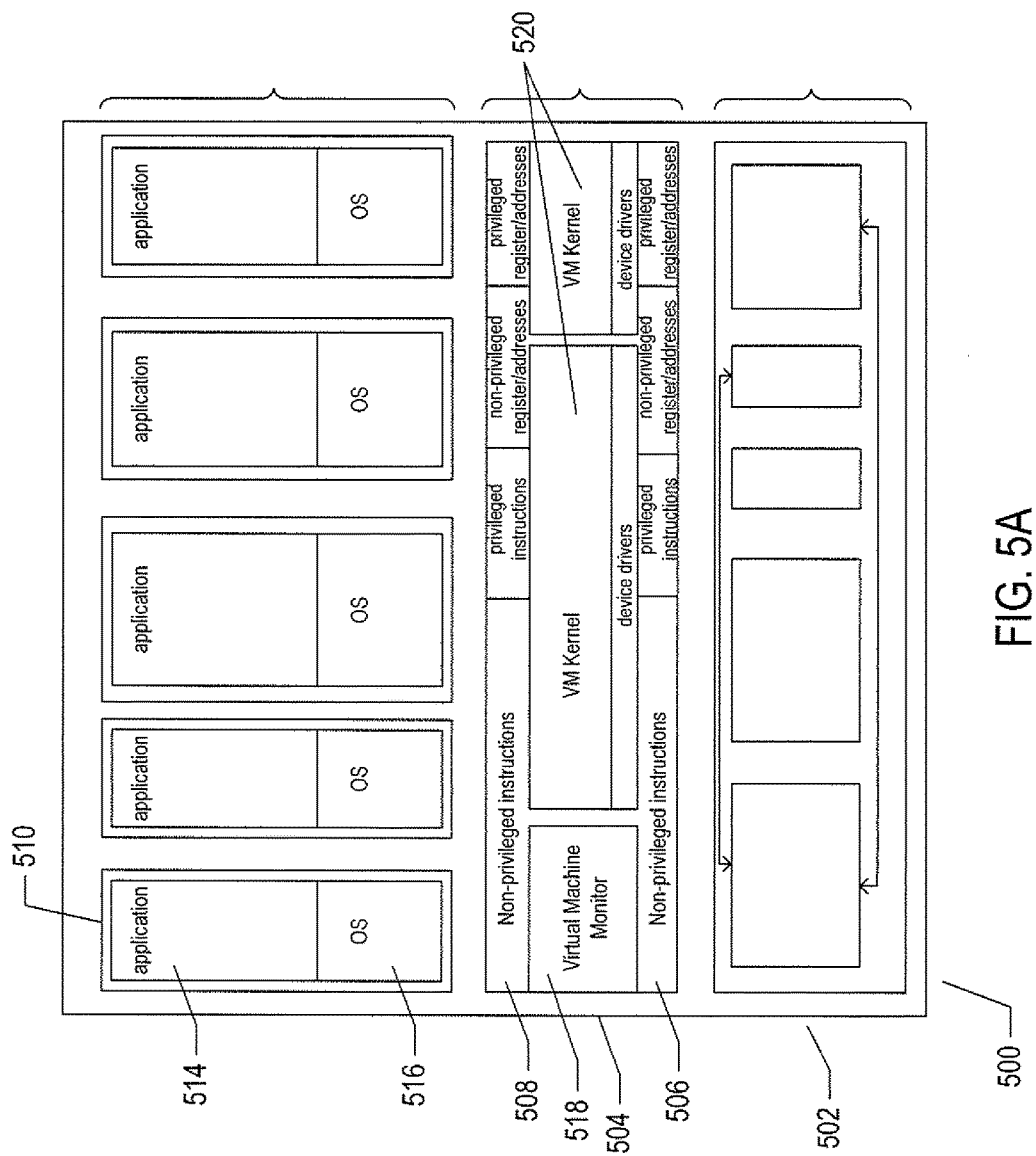
FIGS. 5A-B illustrate two types of virtual machine and virtual-machine execution environments.
Figure 5B:
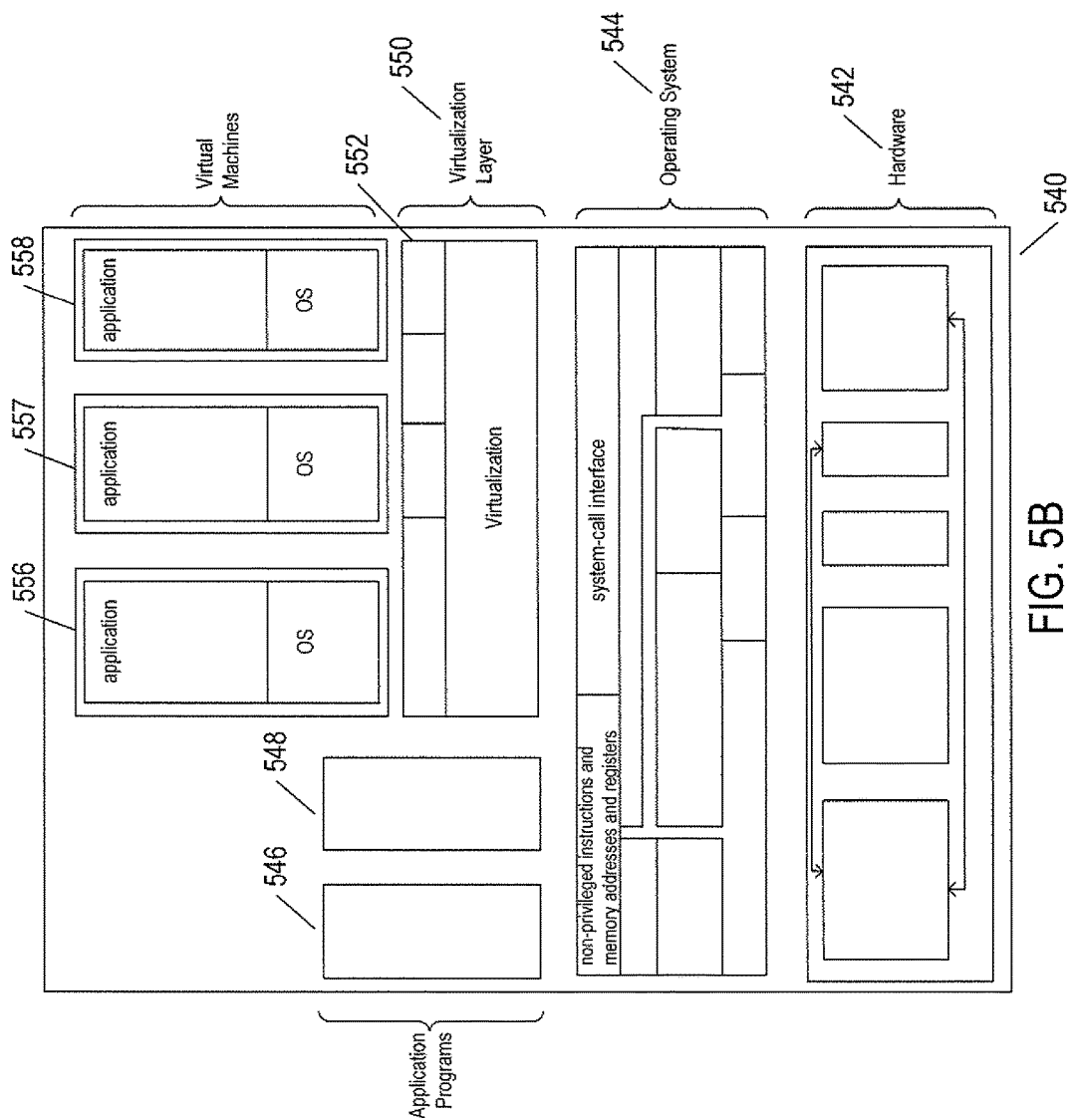

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
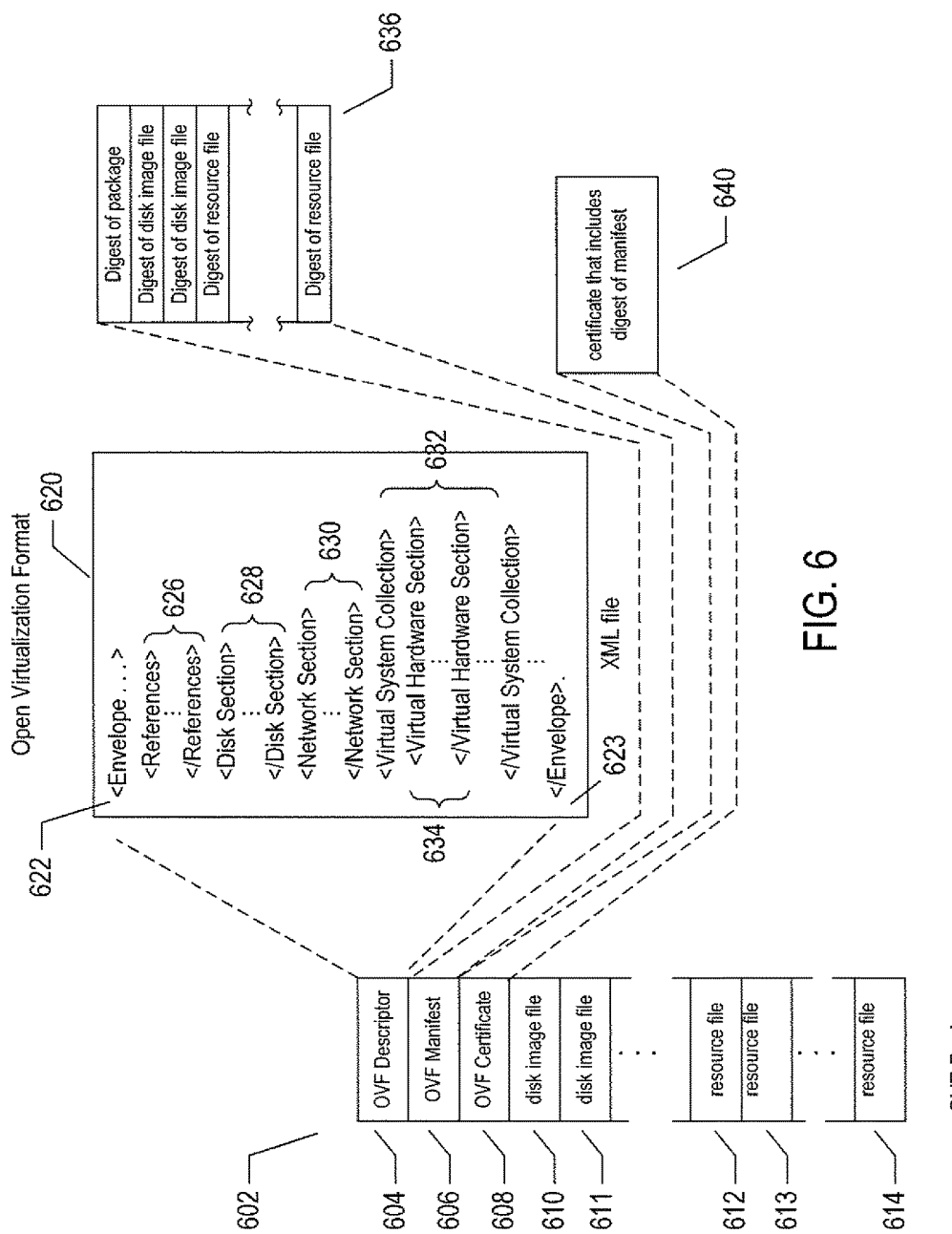
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
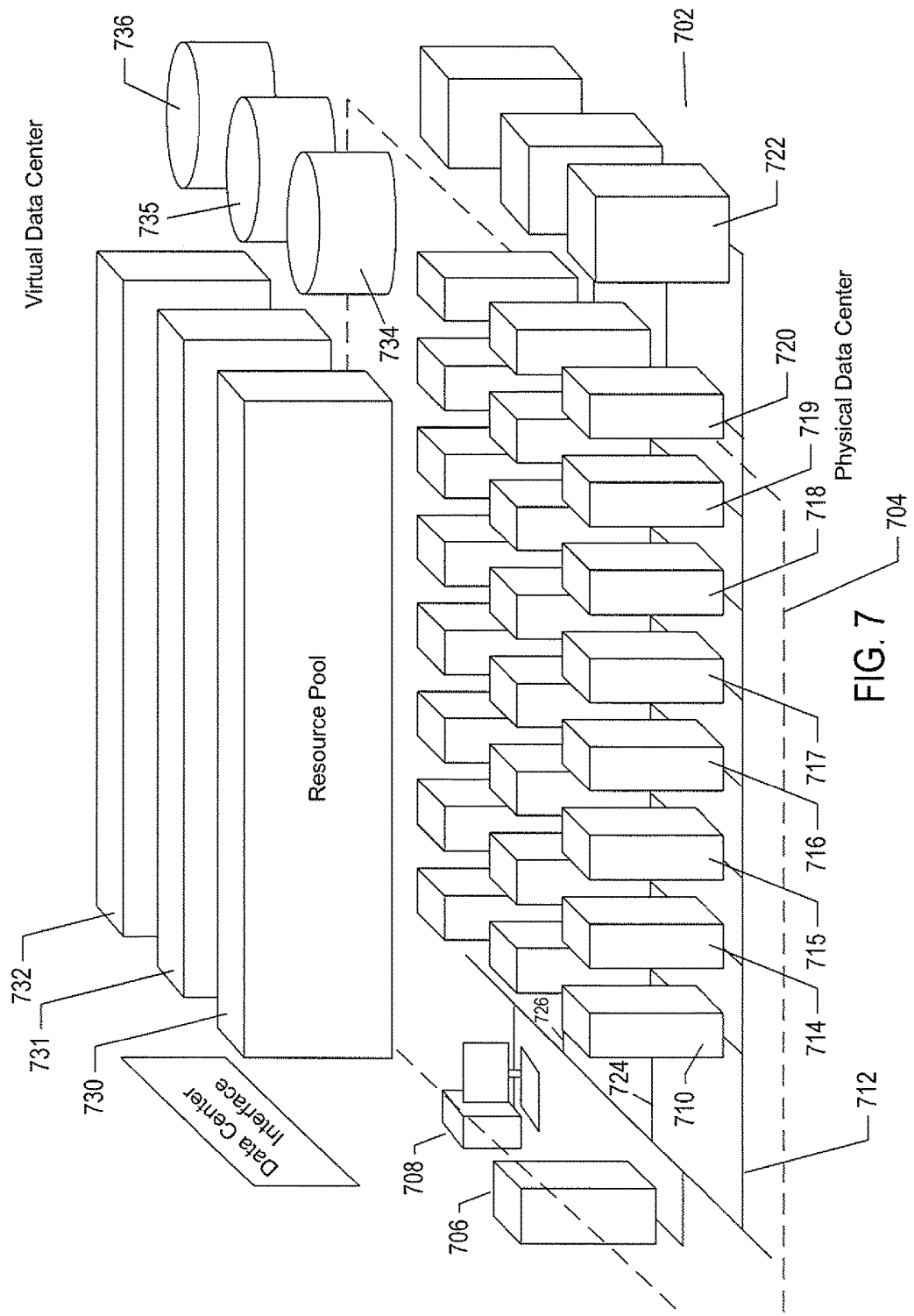
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
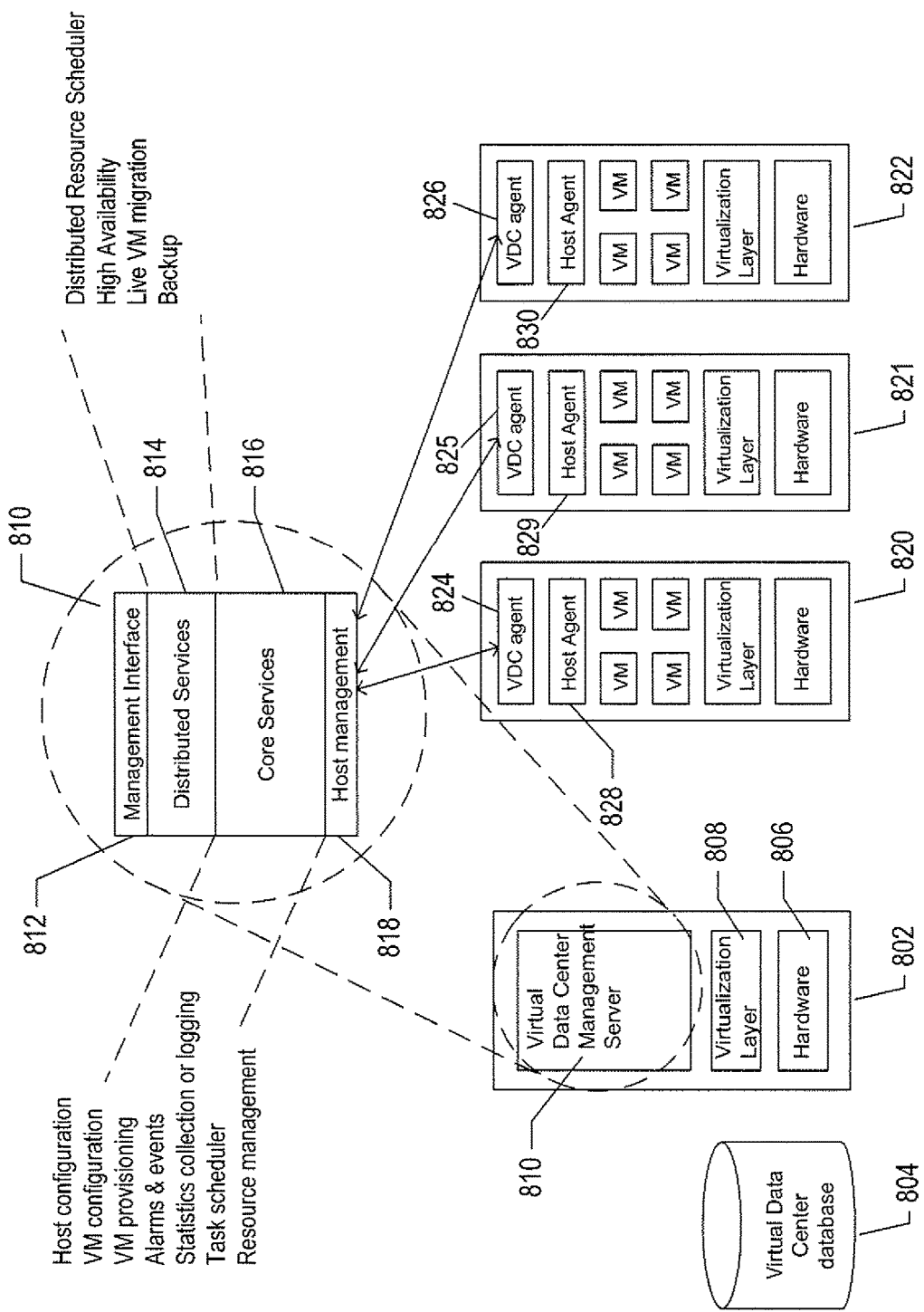
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
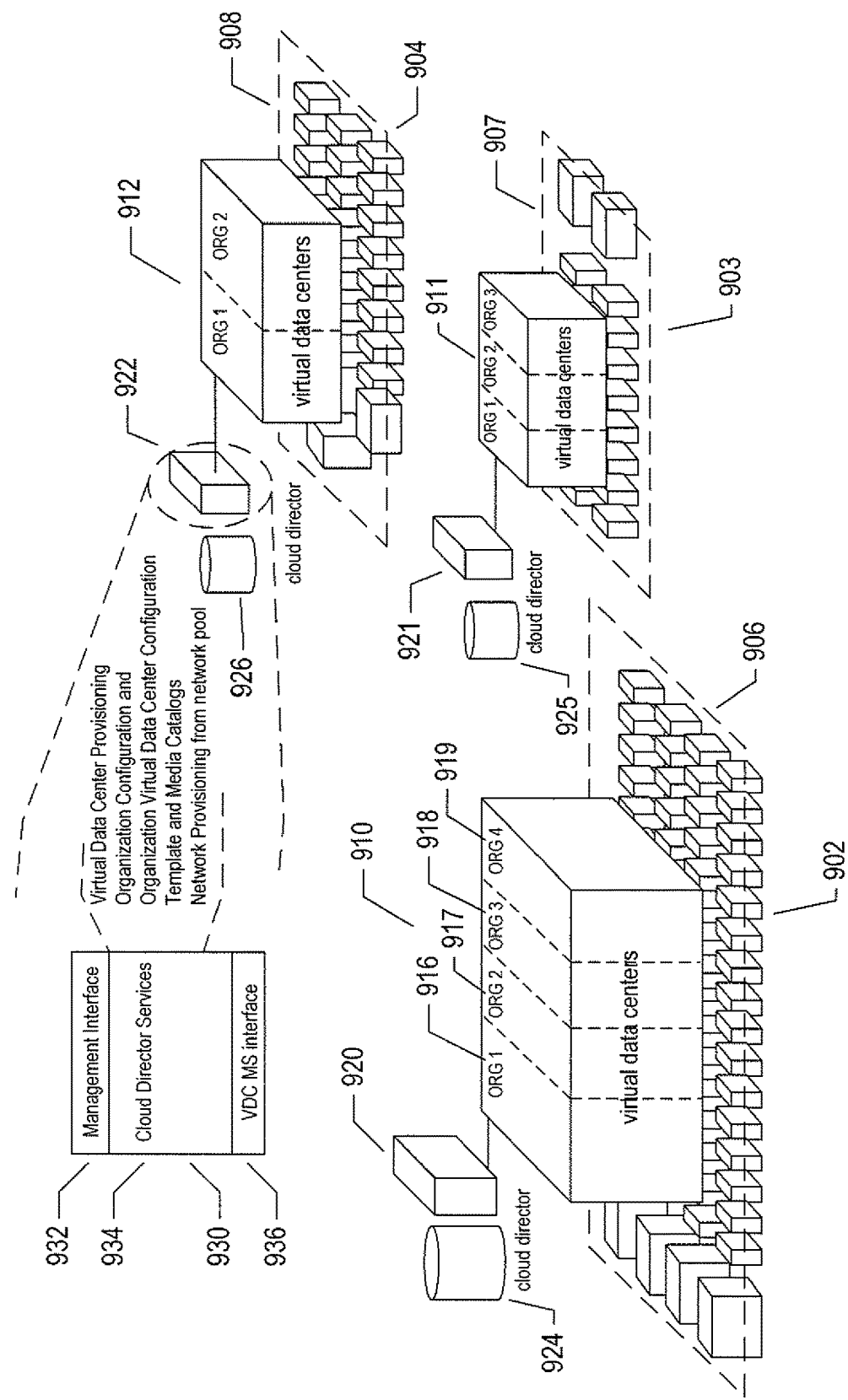
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
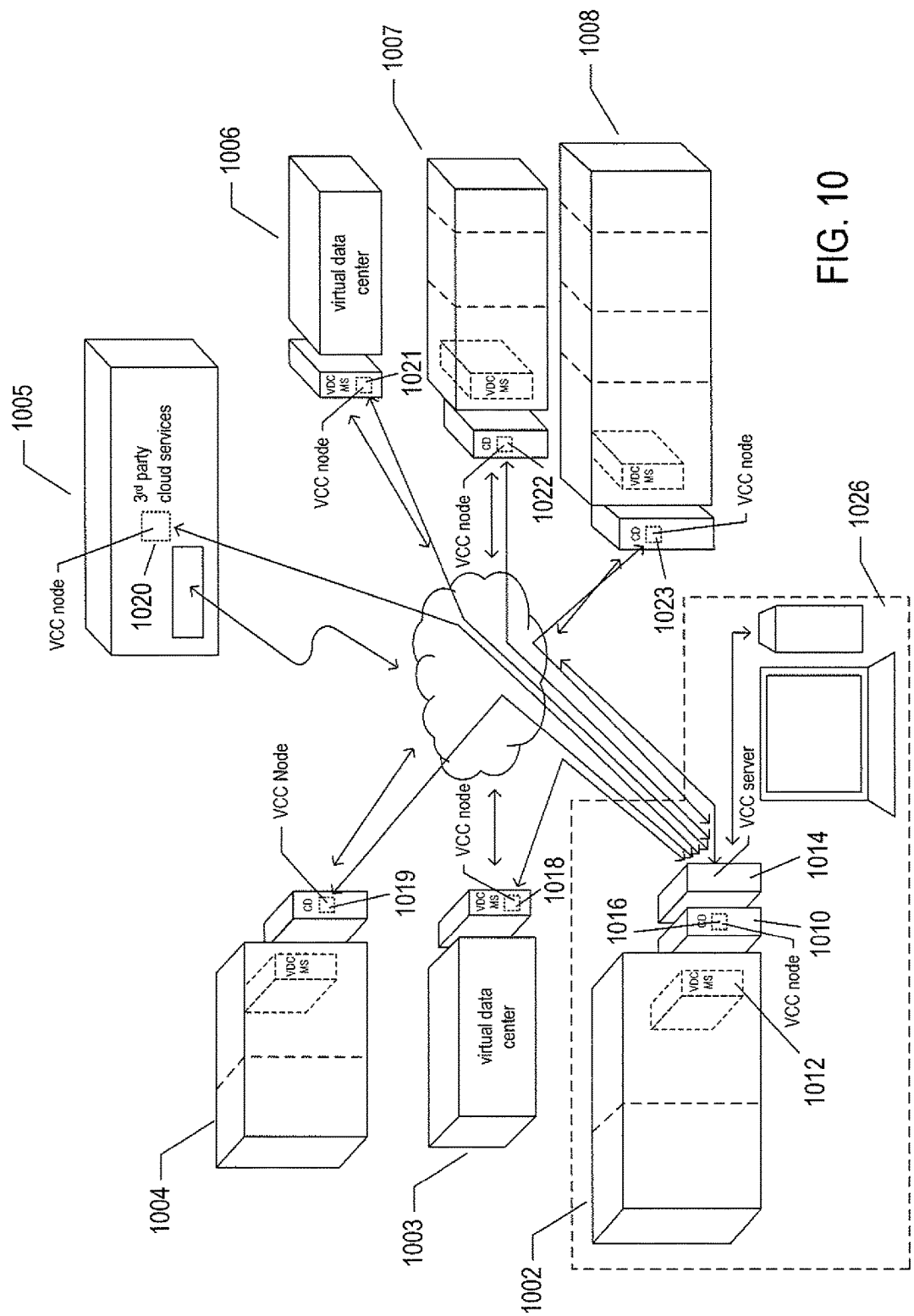
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Virtual-Log-File System

Figure 11:
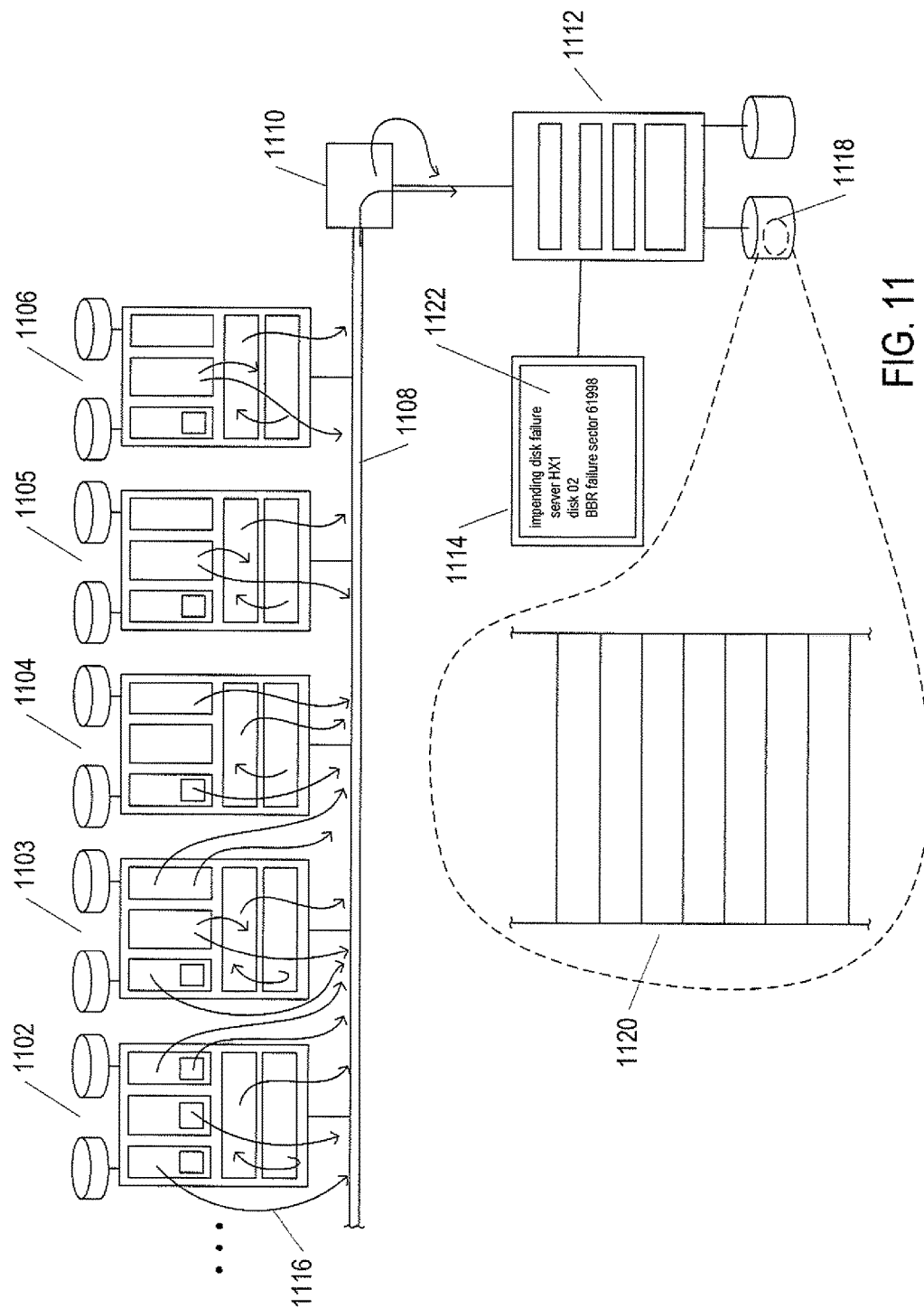
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise.

Figure 13:
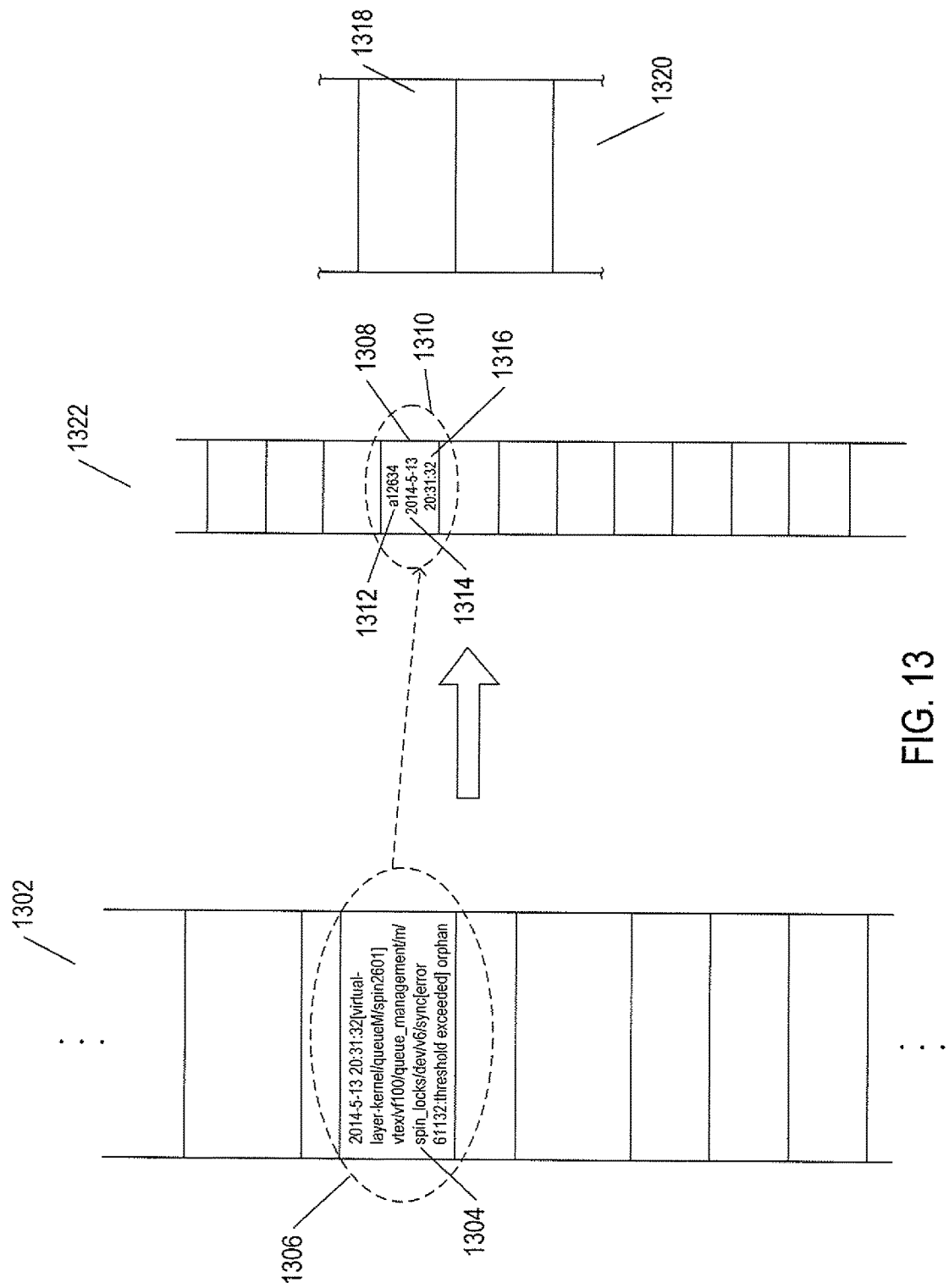
FIG. 13 illustrates one event-message-processing method.

FIG. 13 illustrates one event-message-processing method. In FIG. 13, a traditional event log 1302 is shown as a column of event messages, including the event message 1304 shown within inset 1306. The event-message-processing method automatically processes event messages, as they are received, in order to transform the received event messages into event records, such as event record 1308 shown within inset 1310. The event record 1308 includes a numeric event-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a12634 (1312 in FIG. 13). Thus, event messages may be somewhat compressed and stored as event records in log files. Many other types of processing may be carried out to standardize and normalize event messages in order to produce log files with log entries having a uniform format. For the purposes of describing the virtual-log-file system, it is assumed that the physical log files within a distributed computer system include normalized log-file entries. When this is not the case, log-file entries ingested by the virtual-log-file system may be initially normalized and efficiently stored by the virtual-log-file system to facilitate virtual-log-file-system operations.

The event-record log, such as event-record log 1322, and other types of accumulations of event records have numerous advantages over a traditional event-message log. A first advantage is that each event record is typed. Because the event records are typed, the event-record log can be easily searched, partitioned, and otherwise processed based on event-message types, which produces a significant computational advantage for downstream event-analysis and event-interpretation systems. A second advantage is that, as shown in FIG. 13, event-record logs are significantly compressed with respect to traditional event-message logs. Because only one copy of the non-parameter portion of each type of event message needs to be stored in the associated table, a significant data compression is achieved by the methods and systems to which the current document is directed. The compression ratios achieved depend on the average ratio of non-parameter characters to parameter characters in event messages. In many cases, compression ratios of between 2:1 and 10:1 can be achieved by storing event records rather than event messages. Because terabytes of event messages may be collected on a daily basis within a large, distributed computing system, this potential rate of data compression represents a significant decrease in computational and hardware-usage overheads. A third advantage of event-record logs in comparison to event-message logs is that the event-record logs are fully and uniformly structured, which additionally facilitates downstream automated analysis and interpretation. The downstream analysis and interpretation systems directly acquire relevant parameters and an event type from an event record, without the need for parsing and typing a large variety of different types of event messages.

Figure 14A:
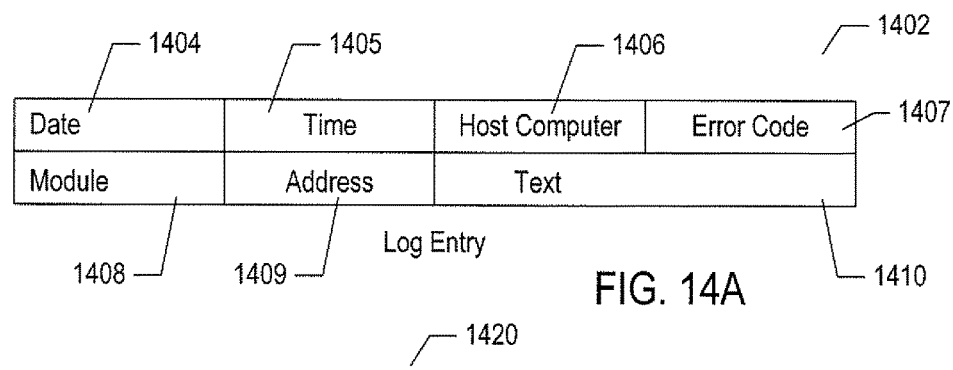
FIGS. 14A-C illustrate a simplified picture of log entries and log files that is used in the remaining discussion of the virtual-log-file system to which the current application is directed.
Figure 14B:
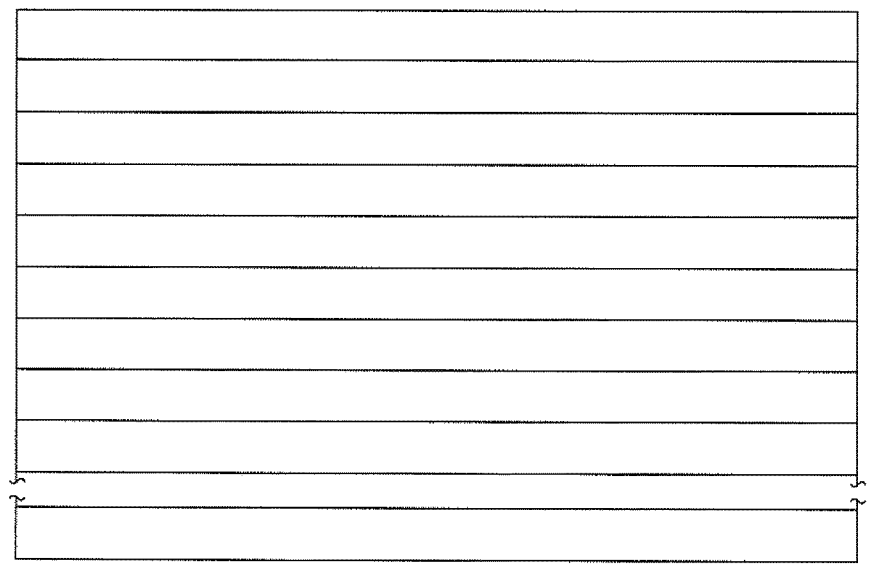
Figure 14C:
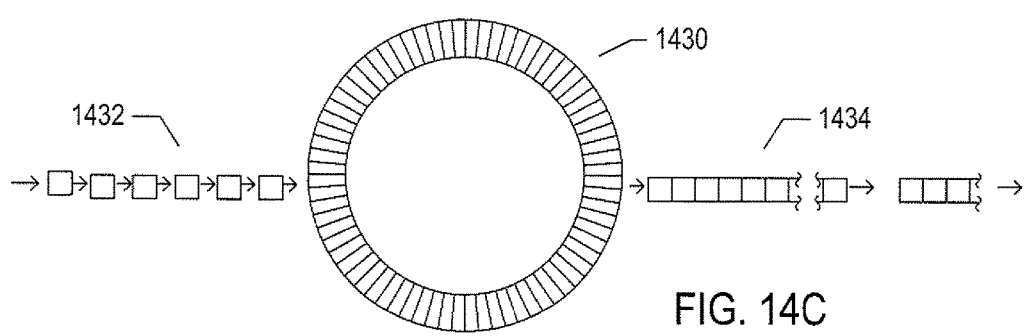

FIGS. 14A-C illustrate a simplified picture of log entries and log files that is used in the remaining discussion of the virtual-log-file system to which the current application is directed. As shown in FIG. 14A, log-file entries, such as entry 1402, are short alphanumeric records that include various different fields. These fields include a date 1404, a time 1405, an identifier for the host computer 1406 which generated the log entry, an error code, also referred to as an "event type" 1407, an identifier of the module that includes the executable instructions that generated the log entry 1408, an address of a point in the module where the executable instructions reside 1409, and a potentially lengthier text field that includes a description of the event, error, anomaly, or other occurrence represented by the log entry 1410. There may be many additional fields in actual log entries stored in log files of different types of computer systems. Log-file entries may have various different formats, encodings, field orders, natural languages, and other differences. In many cases, the log entries collected within log files of a distributed computer system are somewhat standardized based on the operating systems, virtualization layers, and types of application programs running within the distributed system. As discussed above, additional standardization and normalization may occur during processing of error messages input to a logging subsystem within computer systems and components of computer systems and may be carried out by the virtual-log-file system to which the current application is directed when ingesting log entries from physical log files.

As shown in FIG. 14B, a physical log file 1420 can be thought of as a stored sequence of log entries. Any of many different types of files and file structures can be used for log files. Log files may be simple, flat files containing unstructured text that is processed, during file-access operations, into arrays or streams of log entries. Alternatively, log entries may be records within structured files. While traditional random-access files are conveniently used for storing log entries, log files may also be stored on underlying physical media that can be only sequentially read and processed. However, in all cases, standardized physical-log-file-access interfaces can be developed to provide logical physical log files that each consists of a sequence of standardized log entries, as shown in FIGS. 14A-B.

As shown in FIG. 14C, log files may be relatively dynamic entities. The log file may be considered as a logical circular buffer 1430 into which incoming log entries 1432 are continuously or intermittently entered and from which blocks of entries 1434 are removed for archiving on cheaper, slower-access physical media. Alternatively, separate log files may be created and filled with entries over each successive period of time, and stored for a period of time before being archived.

As shown in FIG. 15, the currently disclosed virtual-log-file system can be used to view the contents of current physical log files and, in certain cases, archived physical log files distributed throughout a large distributed computer system, although the virtual-log-file system may also be employed to view the contents of a single physical log file within a single computer system. In FIG. 15, the distributed computer system 1502 includes eight different discrete computer systems 1504-1511, a stand-alone archive of log-file entries 1512, numerous log files, such as log file 1520 in discrete computer system 1504, and numerous archived log files, such as archived log files 1522 contained within, or accessed from, discrete computer system 1510. In fact, in many large distributed computing systems, there may be hundreds, thousands, or more discrete computer systems and processor-controlled devices and tens of hundreds to many tens of thousands or more individual sources for log-file entries stored within thousands of log files distributed throughout the components of the distributed computer system. Clearly, in large distributed computer systems, separately accessing and viewing the contents of the many different physical log files would be a daunting and generally infeasible task.

Figure 16A:
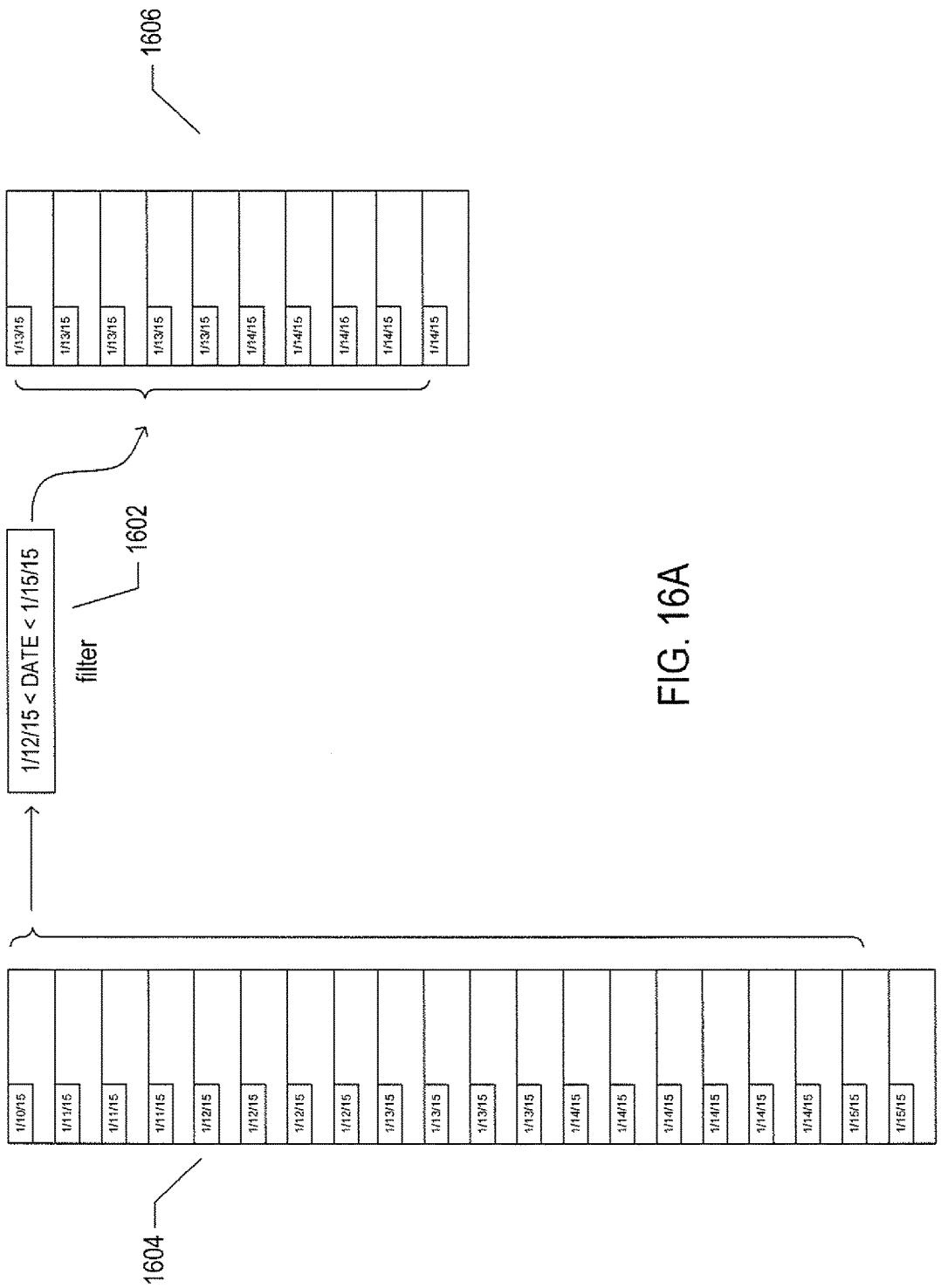
Figure 16B:
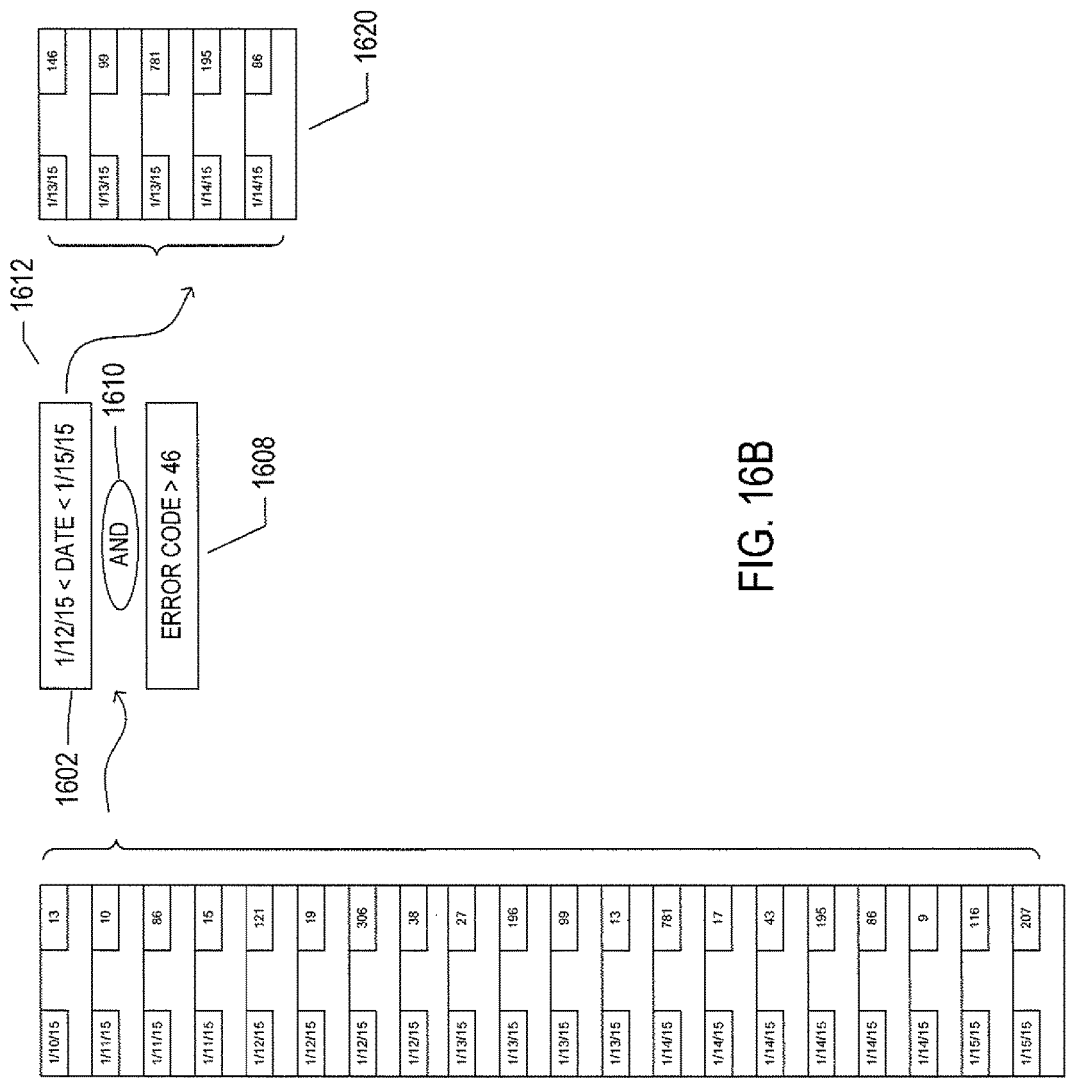

FIGS. 16A-C illustrate log-file-entry filtering. In FIG. 16A, a filter 1602 is applied to a small log file 1604 to produce a resulting, filtered log file 1606. The filter 1602 is a Boolean expression that indicates that the date field of the log-file entries needs to be greater than Jan. 12, 2015 and less than Jan. 15, 2015 in order to be included in the filtered log file 1606. Thus, filter 1602 is a date filter that produce a Boolean TRUE value only for those log-file entries with date fields including the dates Jan. 13, 2015 and Jan. 14, 2015. Only those log-file entries for which a filter returns a TRUE are accepted for inclusion in the filtered log file. There are many ways to encode filters, including Boolean expressions, programmatically, using query languages, or in many other ways. In the current discussion, filters are Boolean expressions that, when evaluated to TRUE for a particular log-file entry, accept the log-file entry into a corresponding filtered file. As shown in FIG. 16B, Boolean expressions of arbitrary complexity can be used to create complex filters. In FIG. 16B, the original date-field filter 1602 is combined with an error-code filter 1608 by the Boolean AND operator 1610. The resulting complex filter 1612 accepts log-file entries for which the date fields contain either Jan. 13, 2015 or Jan. 14, 2015 and the error code field includes a numeric error-code value greater than 46. FIG. 16C shows a complex filter 1616 that includes an OR Boolean operator 1618 instead of the AND Boolean operator 1610 of the complex filter 1612 shown in FIG. 16B. The complex filter 1616 accepts those log-file entries with date fields that contain the dates Jan. 13, 2015 or Jan. 14, 2015 and with any error-code value as well as those log-file entries with error-code values greater than 46 and any date value. As can be seen by comparing the filtered log file 1620 in FIG. 16B with the filtered log file 1622 in FIG. 16C, complex filters with simple filters joined by OR Boolean operators tend to be more permissive than complex filters with simple filters joined by AND Boolean operators.

Figure 17:
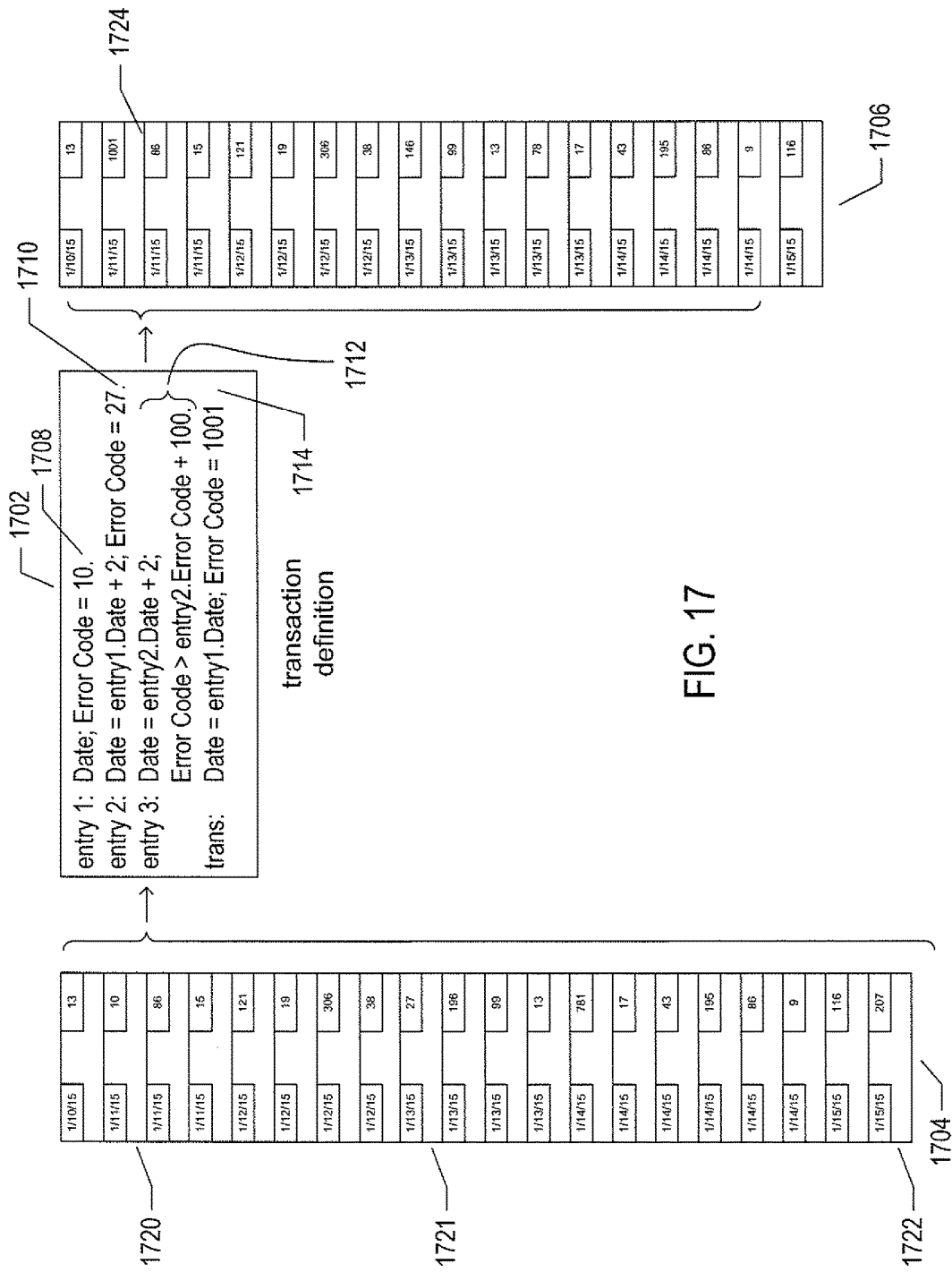
FIG. 17 illustrates a transaction definition.

FIG. 17 illustrates a transaction definition. In many cases, groups of specific types of log-file entries may be combined into a single log-file entry, since the group of log-file entries represents a pattern that can be summarized by a single transaction-type log-file entry. In this case, the term "transaction" indicates multiple underlying physical log-file entries that together correspond to a higher-level event or error more compactly represented by a single higher-level log-file entry. In FIG. 17, a transaction definition 1702 is applied to a small log file 1704 to generate a resultant log file 1706. The transaction definition specifies a pattern of three different types of entries that, when recognized, produces a transaction log-file entry. The first log-file entry, described by a first line 1708 in the transaction definition, indicates that the first log-file entry in the pattern of log-file entries has an error code of 10 and that the date field of the first log-file entry is subsequently used in the definition of subsequent entries of the pattern. A second line 1710 in the transaction definition indicates that the second log-file entry of the pattern has a date field that contains a date that is two days later than the date represented by the date field of the first log-file entry and, in addition, has an error code of 27. The third and fourth lines 1712 of the transaction definition indicates that the third log-file entry of the pattern has a data field containing a date that is two days later than the date represented by the contents of the date field of the second log-file entry and that the error code contained in the third log-file entry is greater than the error code contained in the second entry plus 100. The final line of the transaction definition 1714 indicates that the transaction log-file entry that replaces the pattern of three underlying log-file entries has a date field that contains the date of the first of the three log-file entries and an error code of 1001. Log-file entries 1720-1722 of log file 1704 match the transaction definition, as a result of which these three log-file entries are replaced by a new transaction log-file entry 1724 in the resultant log file 1706.

There are many different possible ways of defining transaction log-file entries and many different ways that a pattern of log-file entries can be replaced by one or more transaction log-file entries. For example, a pattern of log-file entries may be replaced by two transaction log-file entries, one at the same location in the log file as the first log-file entry of the pattern and one at the location of the last log-file entry of the pattern. Often, log-file entries are ordered by date and time, and thus the transaction log-file entry or entries that replace a pattern of normal log-file entries is positioned at a date/time position within the resultant log file related to the date/time positions of the pattern of normal log-file entries replaced by the one or more transaction log-file entries. However, other orderings of log-file entries are possible, in which case the positions of transaction log-file entries with respect to the recognized pattern of normal log-file entries may be computed relative to other types of log-file orderings, such as orderings based on fields other than the date and time fields.

Figure 18A:
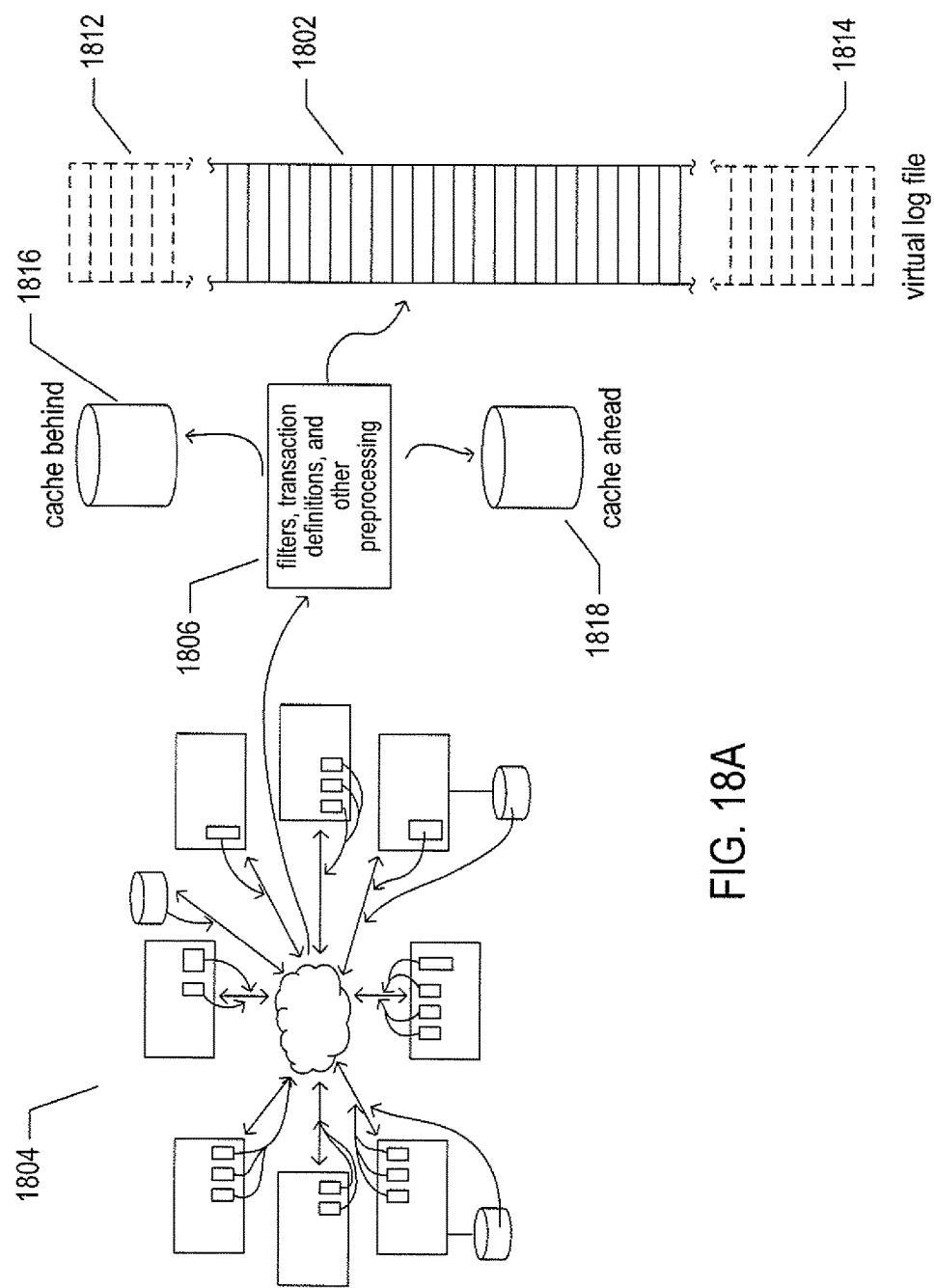
FIGS. 18A-B illustrate the virtual-log-file system to which the current application is directed.
Figure 18B:
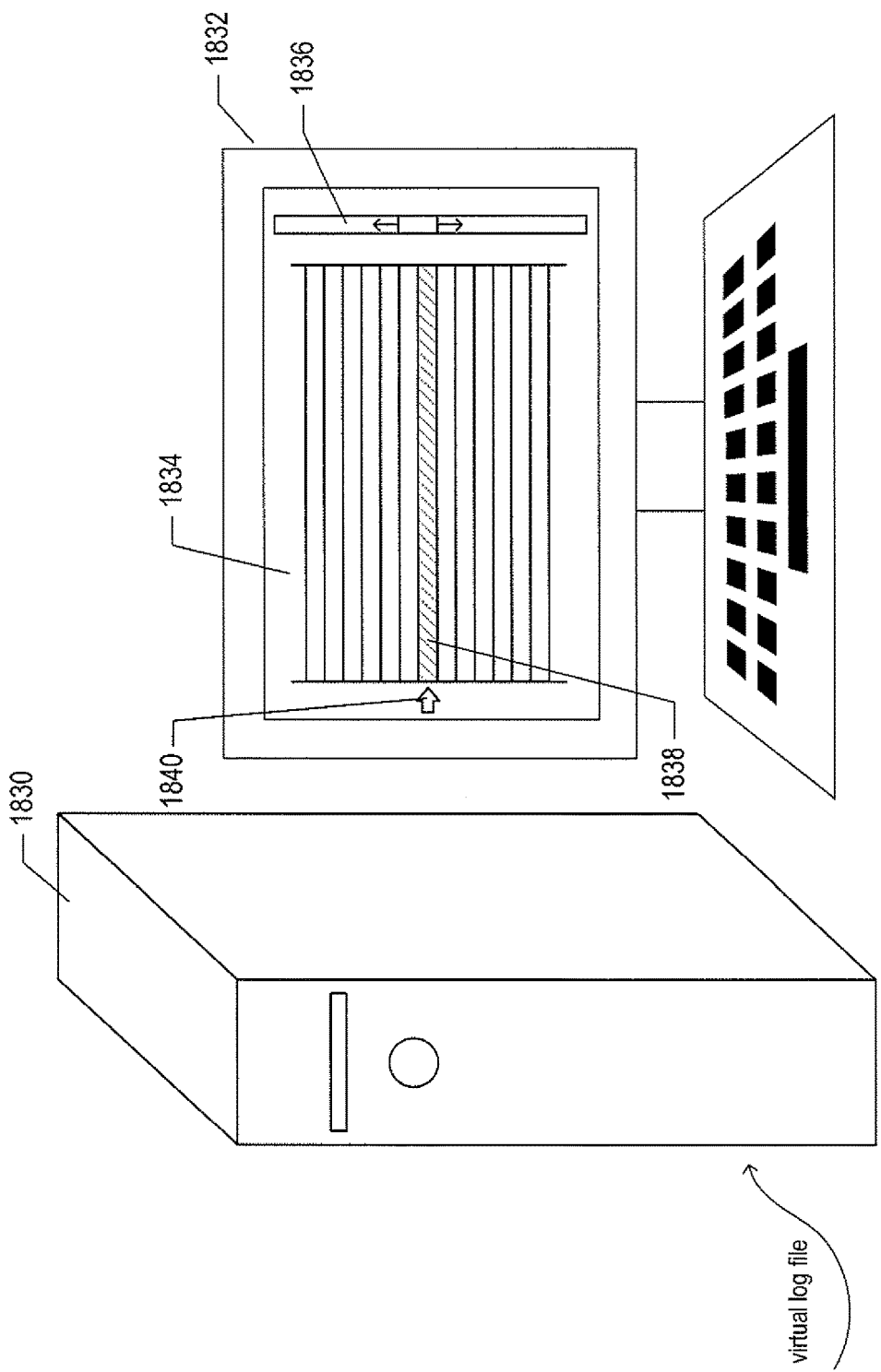

FIGS. 18A-B illustrate the virtual-log-file system to which the current application is directed. Conceptually, the virtual-log-file system assembles a composite or aggregate virtual log file 1802 from all or a portion of the physical log files within a distributed computer system 1804, using merge-sort operations to combine log-file entries stored within all or the portion of the physical log files together into an ordered virtual log file, processing physical-log-file entries by filtering, replacing normal log-file entries with transaction entries, and carrying out various other types of processing, represented in FIG. 18A by block 1806, to produce the virtual log file 1802. The virtual log file often has an enormous logical size. A portion of the log-file entries of the virtual log file may be stored in memory 1810, illustrated by continuous lines in FIG. 18A, while remaining virtual-log-file entries, represented in FIG. 18A by dashed lines 1812 and 1814, are made available to a viewer via scrolling operations. In essence, the virtual-log-file system provides for infinite scrolling either in a backward or forward direction. The portion 1810 of the log-file entries stored in memory represent an in-memory window into the conceptually enormous virtual log file. In one implementation, discussed in greater detail below, additional virtual-log-file entries are stored in two caches 1816 and 1818. The cache 1816, referred to in FIG. 18A as the "cache behind," stores virtual log-file entries logically contained in a portion 1812 of the virtual log file preceding the in-memory portion and the virtual log-file entries stored in cache 1818, referred to as the "cache ahead," are virtual log-file entries logically contained in portion 1814 of the virtual log file following the in-memory portion. As discussed below, as a user moves a small viewing window along the virtual log file, virtual log-file entries may be moved from the cache behind into memory while in-memory log-file entries are moved into the cache ahead, during backward scrolling and virtual log-file entries may be moved from the cache ahead into memory while in-memory log-file entries may be moved from memory into the cache behind during forward scrolling. In addition, collection of log-file entries from the distributed computing system may occur asynchronously with respect to viewing of the virtual log file, in which case entries may be continuously collected and cached in the cache behind and cache ahead while a user views in-memory log-file entries.

In general, the virtual-log-entries are ordered with respect to the date and time fields that indicate when the corresponding physical-log-file entries were created or added to the physical log files from which they are extracted. A natural ordering is for the latest-dated entries to be appended to the lower end of the virtual log files, as shown on FIG. 18A, or inserted into the cache ahead, when the in-memory portion is full, so that the scroll-ahead operation moves a logical display window to display more recently created virtual-log-file entries and so that the scroll-backward operation moves the logical display window to display less recently created virtual-log-file entries. However, the order of the entries in the virtual log file may be alternatively specified by a user. In general, a user can specify ascending or descending ordering of the virtual-log-file entries based on the contents of one or a combination of selected fields. In certain implementations, the ordering may be defined by a user-provided comparison function, a reference to which is supplied to the virtual-log-file system for use by the merge-sort operations used by the virtual-log-file system to merge streams of physical-log-file entries together to construct the virtual log file.

FIG. 18B illustrates the display of a virtual log file to a user. The virtual log-file entries are provided, over a network, to a user computer 1830. A browser-like application running on the user computer displays, on the user's display device 1832, a small window 1834 into the virtual log file. A scroll bar 1836 allows a user to move the window into the virtual log file, via backward and forward scrolling operations, along the logical sequence of virtual log-file entries. In addition, a user may select a particular entry 1838, shown cross-hatched in FIG. 18B and with a small arrow 1840 to the left of the selected entry, as an anchor entry. The virtual-log-file browser-like application keeps track of this anchor entry so that, as the user scrolls backward and forward to view additional log-file entries, the user can, at any time, quickly return to the anchor entry by input to an input feature of the displayed virtual log file. In many implementations, a user can select or define multiple anchor entries.

Figure 19A:
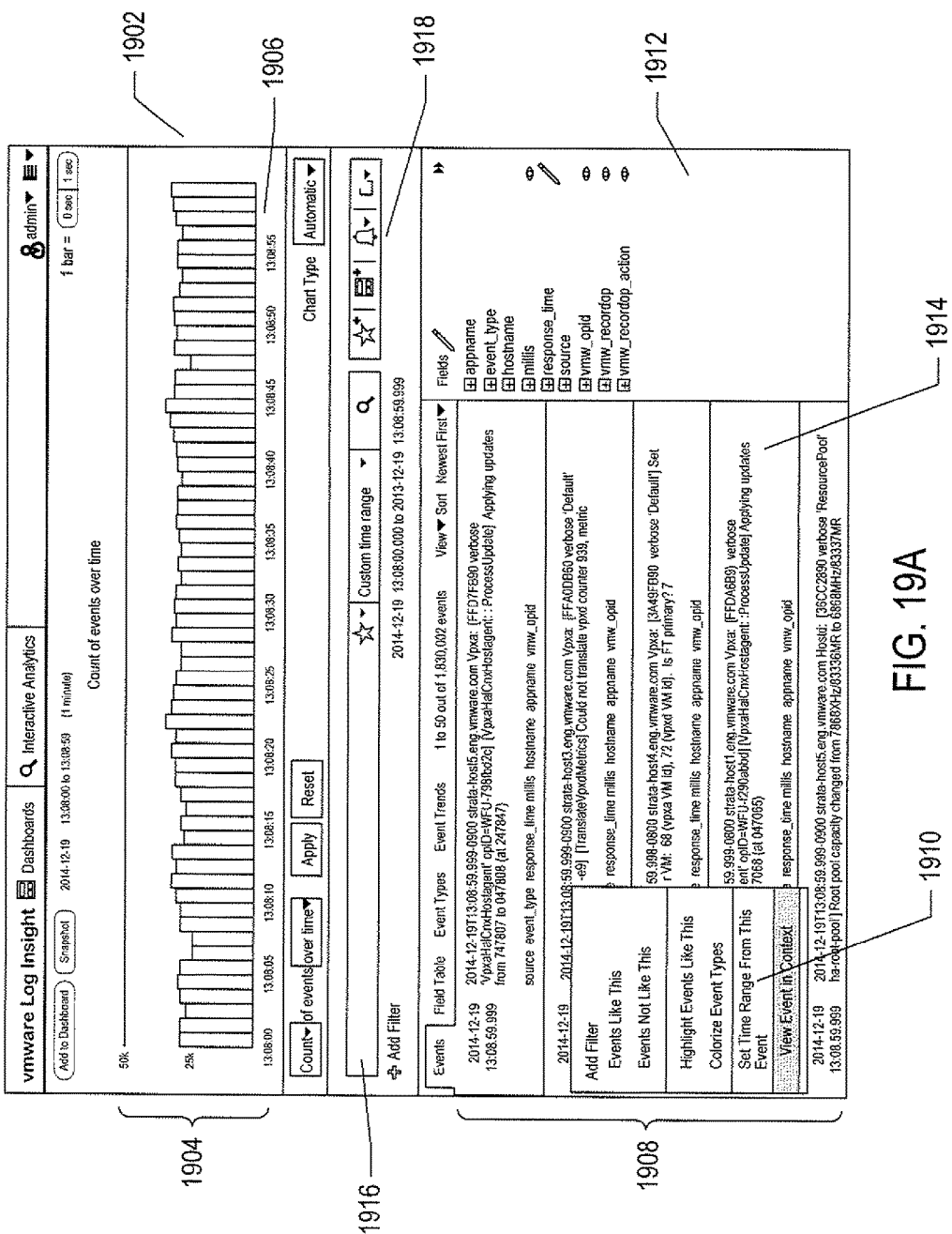
Figure 19B:
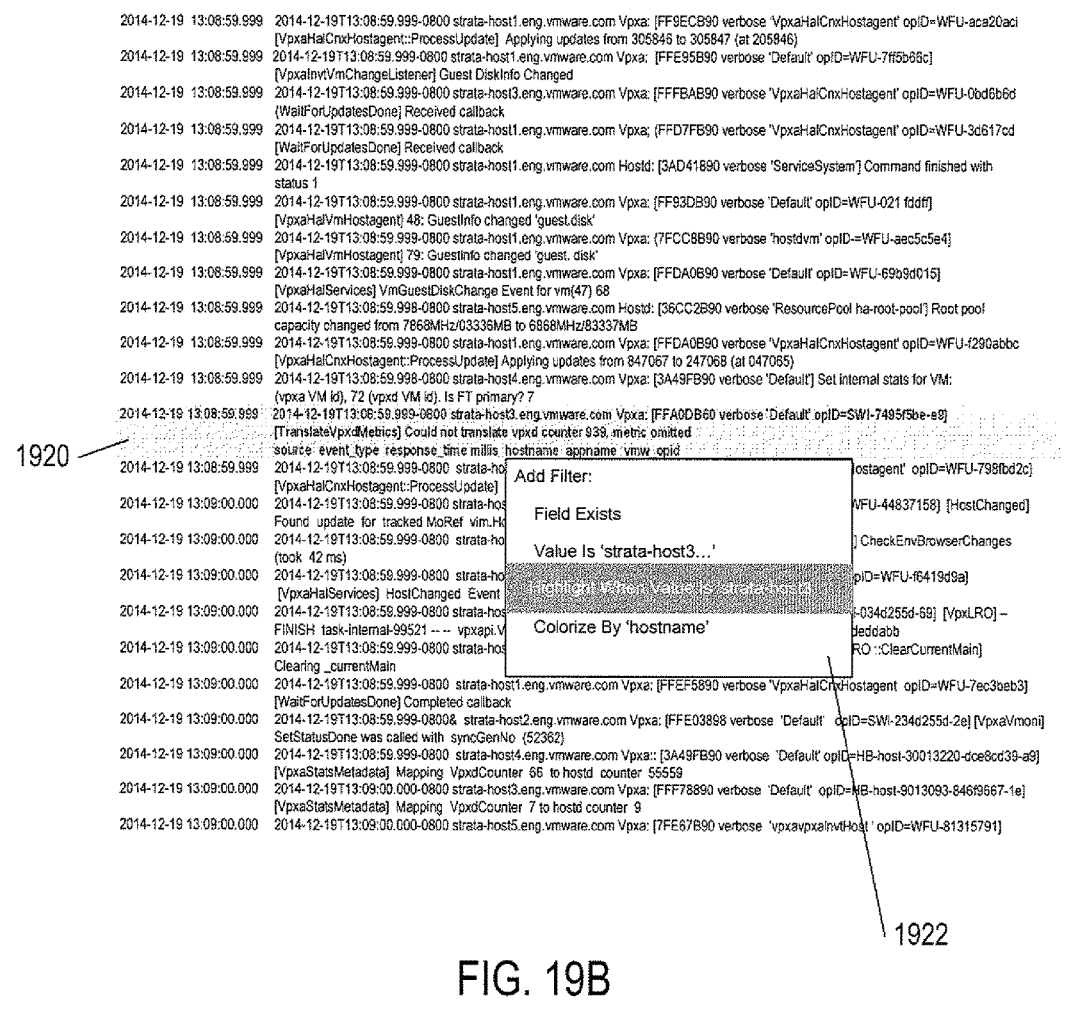

FIGS. 19A-B show screen-shot-like illustrations of virtual-log-file displays provided by an implemented virtual-log-file system. The virtual-log-file display 1902 shows virtual-log-file entries ordered by date and time. A histogram-like upper displayed portion 1904 shows vertical bars representing the number of log-file entries, or events, at one-second intervals along a time line 1906. This is one example of many types of graphics that may be used to represent the contents of an extensive region of the virtual log file that cannot be displayed to the user as individual log-file entries within the real estate available on a display device. A lower-portion of the display 1908 displays details about a small number of log-file entries that represent the contents of a local display window currently positioned over those events. The virtual-log-file display additionally contains various input features. For example, a small drop-down menu 1910, invoked by a mouse click or other user input, allows a user to add additional filters, highlight log-file entries of particular types, choose different display colors for the background of different types of log-file entries, reorder log-file entries, and select a new time range for displayed events. A right-hand panel 1912 allows a user to select which of the various fields of events to display in the detailed log-file-entry displays, such as detailed log-file-entry display 1914. Additional input features, such as input feature 1916, allow for input of a new time-range filter or other types of filters as well as selection of various additional display features 1918.

FIG. 19B shows a larger display window in which 23 events, or virtual log-file entries, are displayed. A user has selected a particular event 1920, which is highlighted as a result of the selection. A drop-down menu 1922 allows the user to add a filter based on field values within the selected entry. FIGS. 19A-B are examples of the many different types of virtual-log-file displays and virtual-log-file implementations. As new filters are added, the combination of filters associated with the virtual log file is automatically applied to the virtual log file, resulting in changes to the set of currently displayed log-file entries. In certain implementations, the current set of filters may be deleted and new filters defined, in which case the current entries of the virtual log file may be purged and new virtual-log-file entries may begin to be collected from the distributed computer system. Users may reorder the virtual log file based on different combinations of log-file-entry fields, change the background colors or other aspects of the appearance of the log-file entries based on user-defined criteria, snapshot and store portions of the currently displayed virtual log file, and carry out many other types of operations and analyses provided by the virtual-log-file system.

Figure 20A:
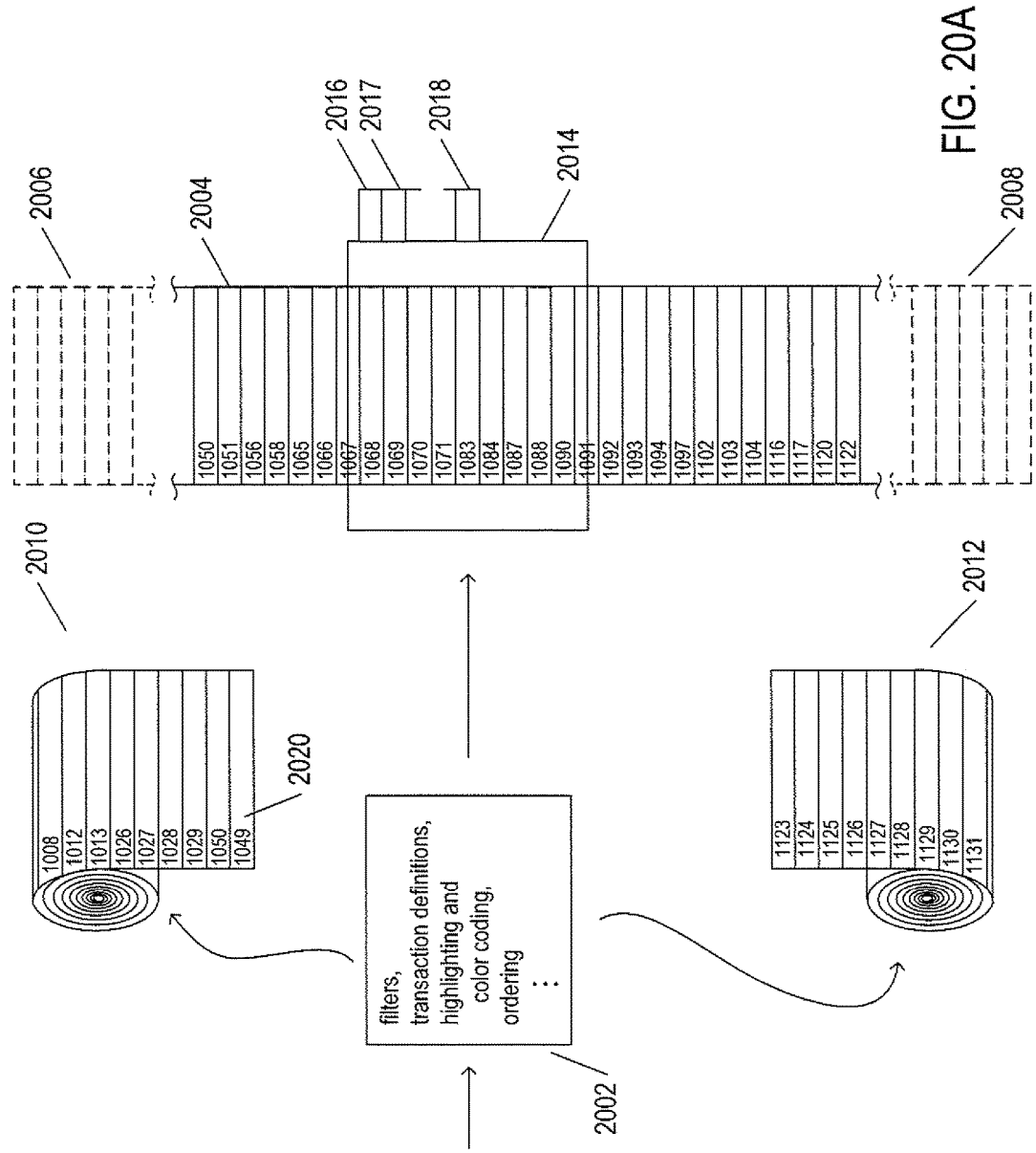
FIGS. 20A-F illustrate logical operation of the virtual-log-file system to which the current application is directed.

FIGS. 20A-F illustrate logical operation of the virtual-log-file system to which the current application is directed. As discussed with reference to FIG. 18A, initially, log-file entries are collected from many different log-file-entry sources within a distributed computer system. These log-file entries are combined by merge/sort operations and then subject to various types of processing, including filtering, replacement of log-file-entry patterns with transaction log-file entries, various types of processing for display, including highlighting and color coding particular types of log-file entries, and various types of ordering operations. The processing of the collected log-file entries is represented in FIG. 20A by block 2002. An initial set of virtual-log-file entries produced by the collection and processing operation are placed into a memory buffer 2004, shown in FIG. 20A as a sequential set of log-file entries using solid lines. Preceding log-file entries are represented by the dashed entries 2006 and following virtual-log-file entries are represented by dashed entries 2008, as in FIG. 18A. The collection and processing continues asynchronously to enter preceding virtual-log-file entries into the cache behind 2010 and following virtual-log-file entries into the cache ahead 2012. The cache behind 2010 and the cache ahead 2012 may be stored in other types of local or remote memory banks, in mass-storage devices, or in other log-file-entry-storage media accessible to virtual-log-file system. A small portion of the in-memory virtual-log-file entries is displayed to a user at any particular time, that portion enclosed within a display window 2014. The display window is associated with a set of references to anchor entries 2016-2018. As discussed above, a user may scroll through the virtual-log-file entries of the virtual-log file by repositioning the display window 2014 using scrolling operations or various anchorentry-based operations. Scrolling may involve simply reading preceding or following virtual-log-file entries from memory or, when the scrolling exceeds the limits of the virtual-log-file entries stored in memory, may involve moving virtual-log-file entries from a first cache into memory and from memory into a second cache, as discussed above. In FIG. 20A, each of the virtual-log-file entries includes a sequence number, such as the sequence number 1149 (2020 in FIG. 20A). The sequence numbers refer to the logical sequence of the collected and merged physical-log-file entries prior to the processing operations represented by block 2002 in FIG. 20A. In the example shown in FIG. 20A, filtering has removed a significant number of the received physical-log-file entries from the virtual log file.

Figure 20B:
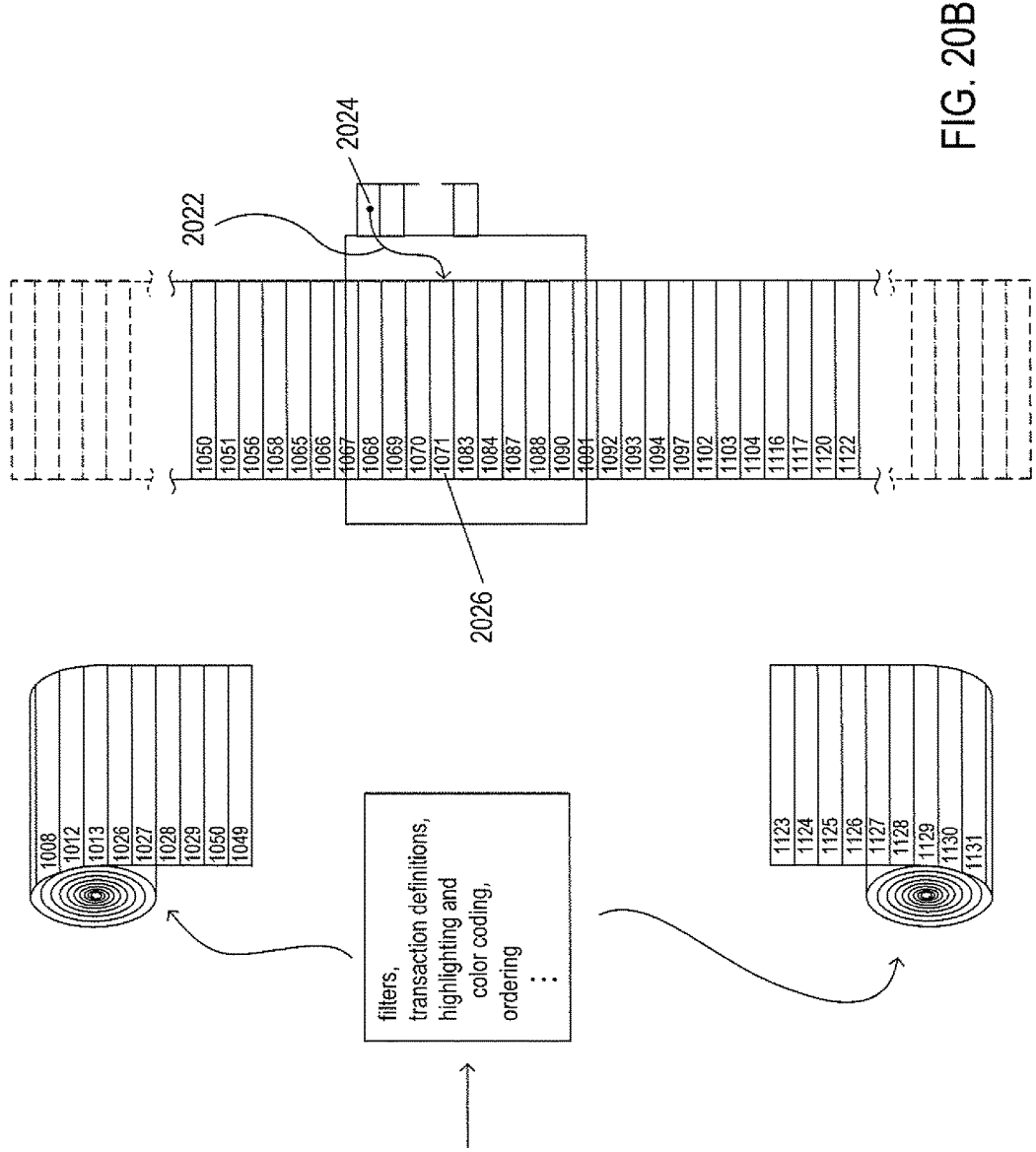

FIG. 20B illustrates selection of an anchor entry by a user. User input to the virtual-log-file display results in a reference, represented by curved arrow 2022, being stored in the first cell of the anchor-entry array 2024. Thus, the virtual-log-file entry with sequence number 1071 (2026 in FIG. 20B) has been defined by the user as an anchor entry.

Figure 20C:
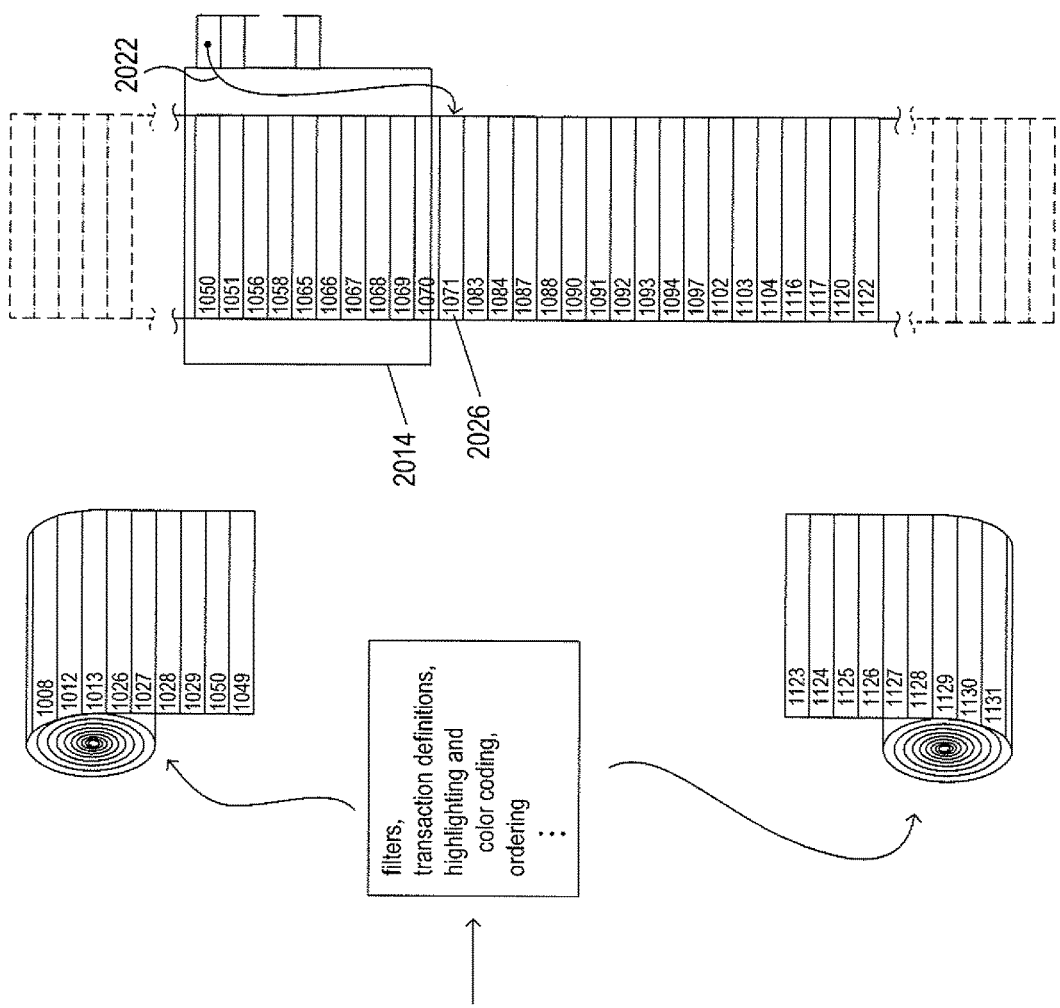

FIG. 20C illustrates scrolling of the display window upward through the virtual log file. The display window 2014 now displays the virtual-log-file entries that begin with the sequence number 1050 and end with the sequence number 1069. Thus, the display window 2014 has been scrolled backward, or upward, with respect to the virtual log file. Note, however, that the anchor-entry reference 2022 remains associated with anchor entry 2026 despite the fact that anchor entry 2026 is no longer within the display window and therefore no longer viewable by the user in the displayed virtual-log-file entries.

Figure 20D:
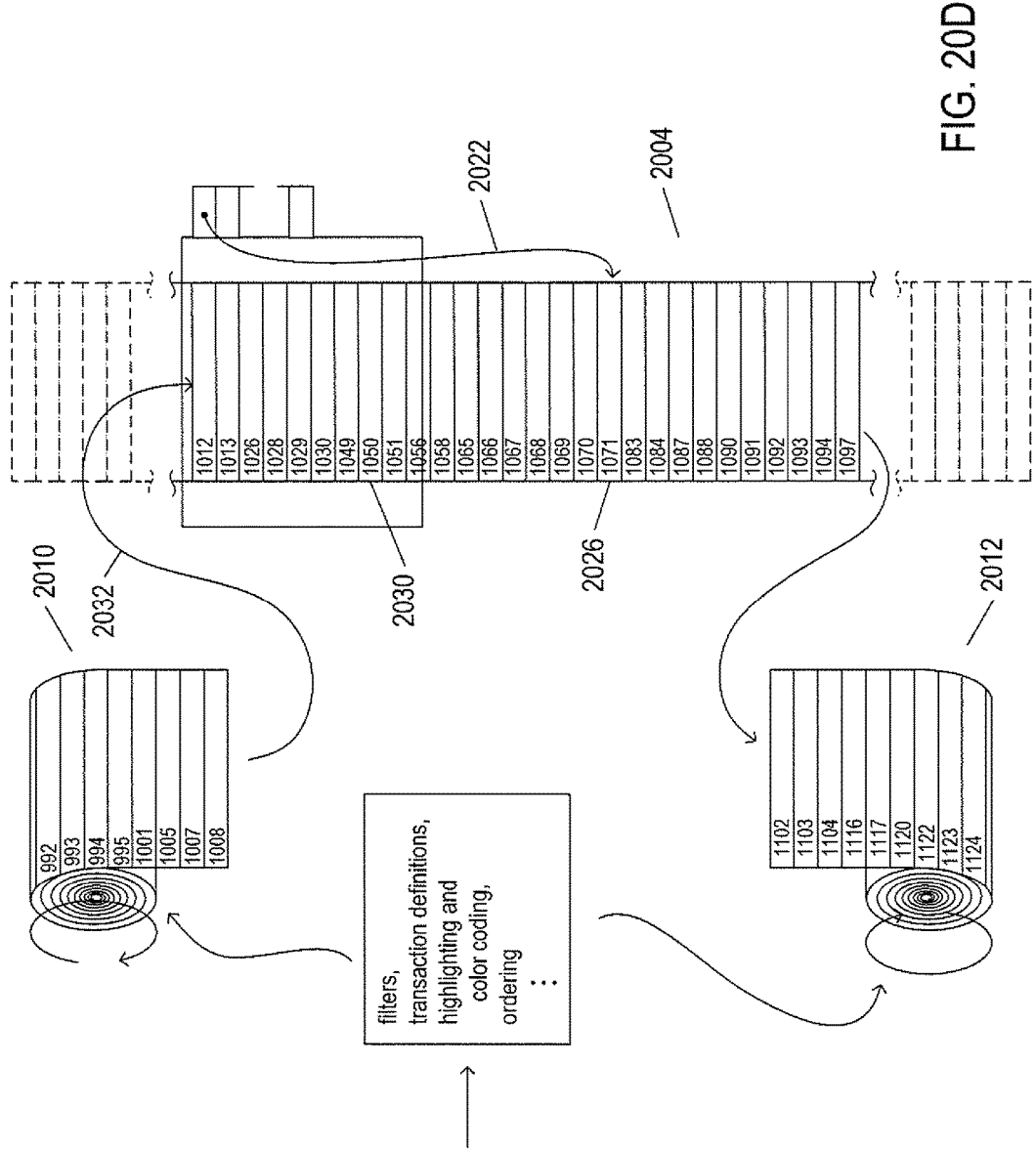

FIG. 20D illustrates backwards scrolling past the end of the in-memory virtual-log-file entries. In FIG. 20D, additional backwards scrolling has moved the display window further back from the virtual-log-file entry 2030 that was previously the first virtual-log-file entry in the in-memory portion of the virtual log file, as shown in FIGS. 20A-C. As a result, additional virtual-log-file entries have been moved from the cache behind 2010 to memory 2004, as represented by curved arrow 2032. In order to make room for these additional virtual-log-file entries, an equal number of virtual-log-file entries have been moved from memory 2004 to the cache ahead 2012. Note that the anchor reference 2022 continues to reference anchor entry 2026.

Figure 20E:
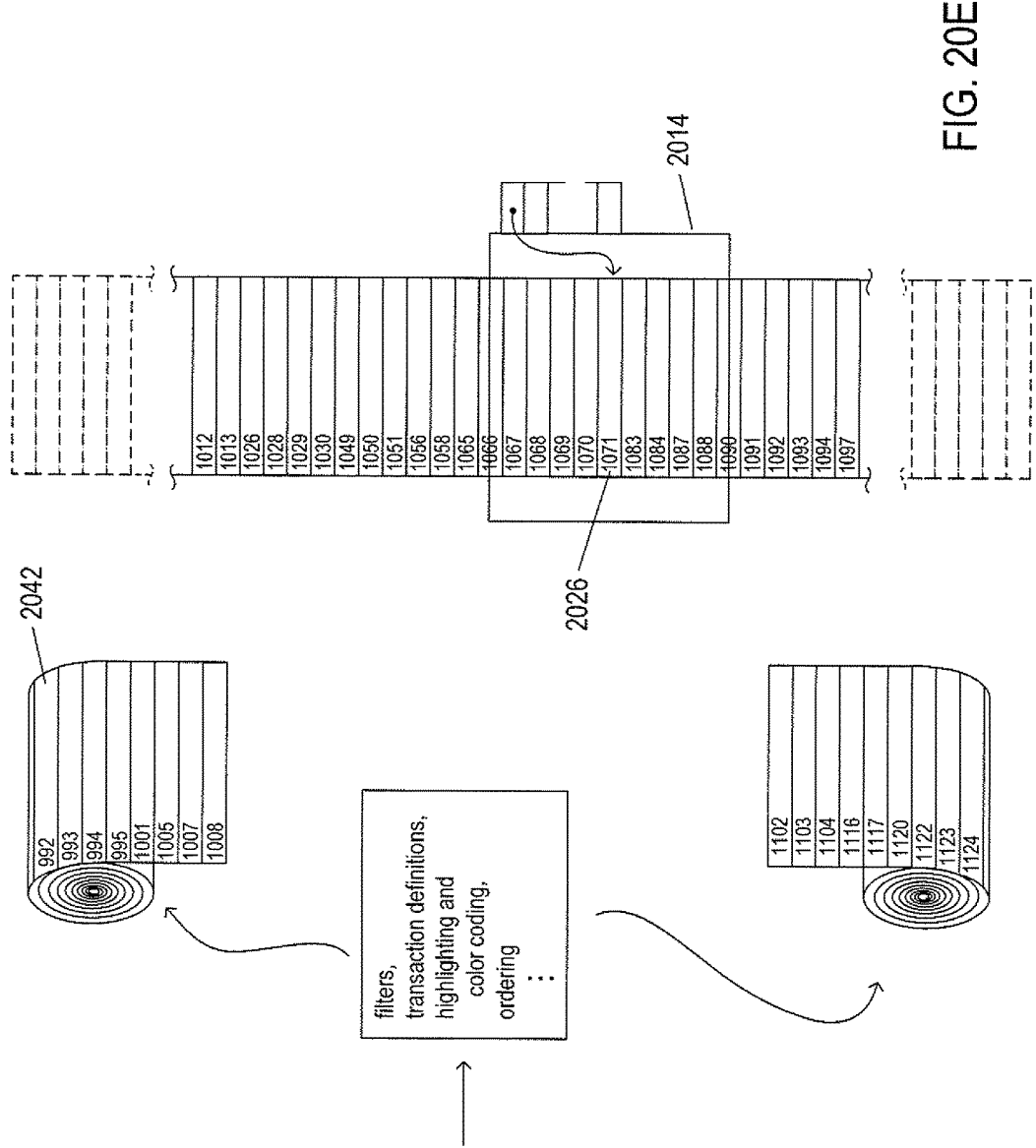

FIG. 20E illustrates a return-to-anchor operation. Following the scrolling operation illustrated in FIG. 20D, a user has input a mouse click or other input to a return-to-anchor feature of the virtual-log-file display. As a result, the display window 2014 has been re-centered over the anchor entry 2026. In this case, the anchor entry was present in the in-memory portion of the virtual log file. Had it not been, then scrolling operations that involve movement of virtual-log-file entries from cache to memory and from memory to cache would have first been undertaken in order to return the anchor virtual-log-file entry to the in-memory portion of the virtual log file prior to repositioning of the display window.

Figure 20F:
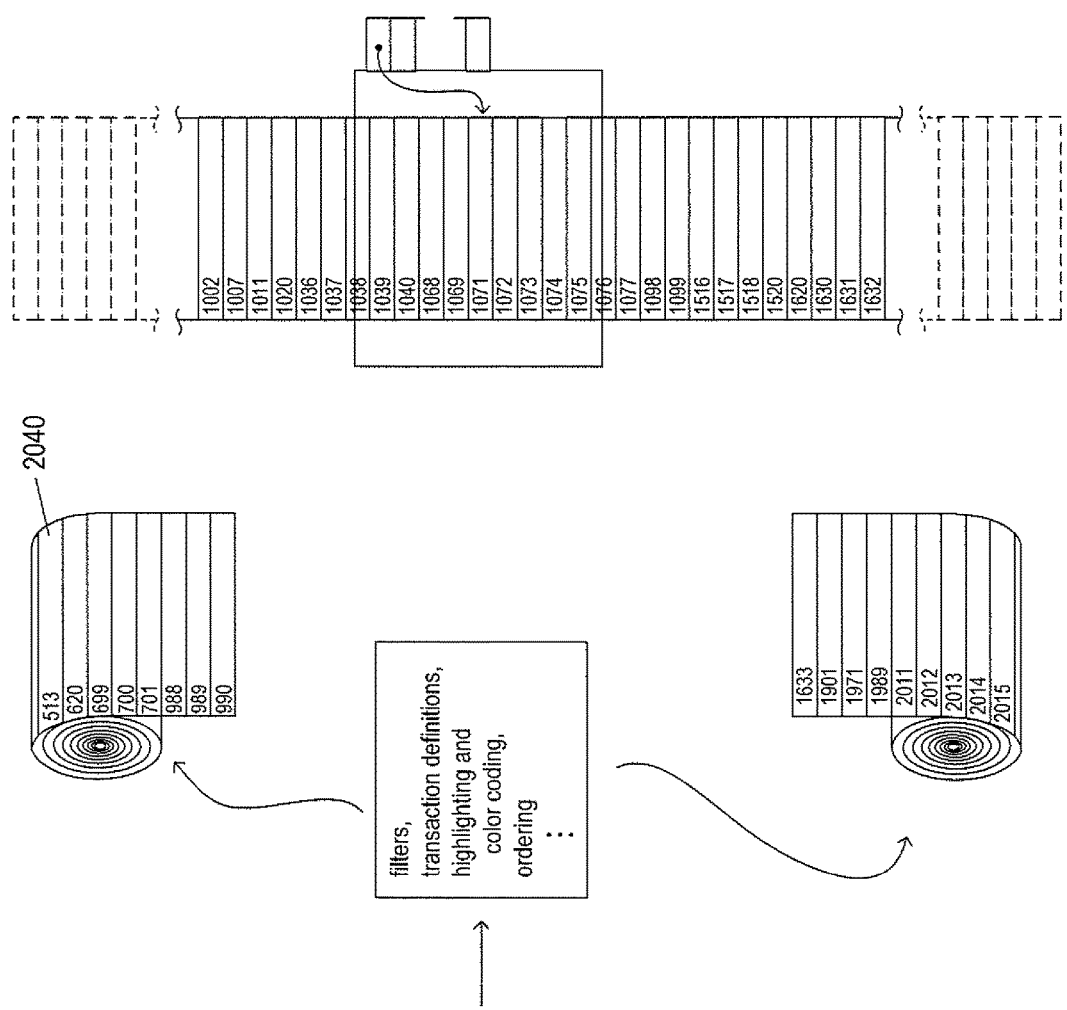

FIG. 20F illustrates addition of a filter to the set of filters that define the virtual log file. A user has input a new filter, through filter-input features. As a result, many more entries previously present in the virtual log file have been removed, as can be seen by comparing the sequence identifiers in the virtual-log-file entries shown in FIG. 20F, such as by comparing the sequence identifier 513 in entry 2040 in FIG. 20F with the sequence identifier 992 in entry 2042 in FIG. 20E. Adding filters may involve removing entries from the virtual log file and reconsolidating the remaining entries, which may, in turn, involve movement of virtual-log-file entries from cache to memory as well as continued collection and processing of log entries from the distributed computing system for addition to the caches.

When newly added filters are applied to the virtual log file, user-specified anchor entries may end up being identified for removal because they no longer pass the new, combined filter associated with the virtual log file. In one implementation, removal of existing anchor entries from the virtual log file is prevented. In other implementations, a dialogue window may be displayed to solicit retention or removal of any existing anchor entries that no longer pass the new, combined filter associated with the virtual log file. When a user indicates removal of one or more of the anchor entries that no longer pass the filter, the contents of anchor-entry array are correspondingly adjusted. In yet alternative implementations, handling of filtered anchor entries may be specified by a user as a configuration parameter. In general, application of newly added filters leave the virtual log file in a consistent state, so that subsequent problems associated with orphaned anchor-entry-array references are avoided. Either the anchor entries are not filtered or, when filtered, the anchor-entry array is updated to remove references to filtered anchor entries.

Figure 21:
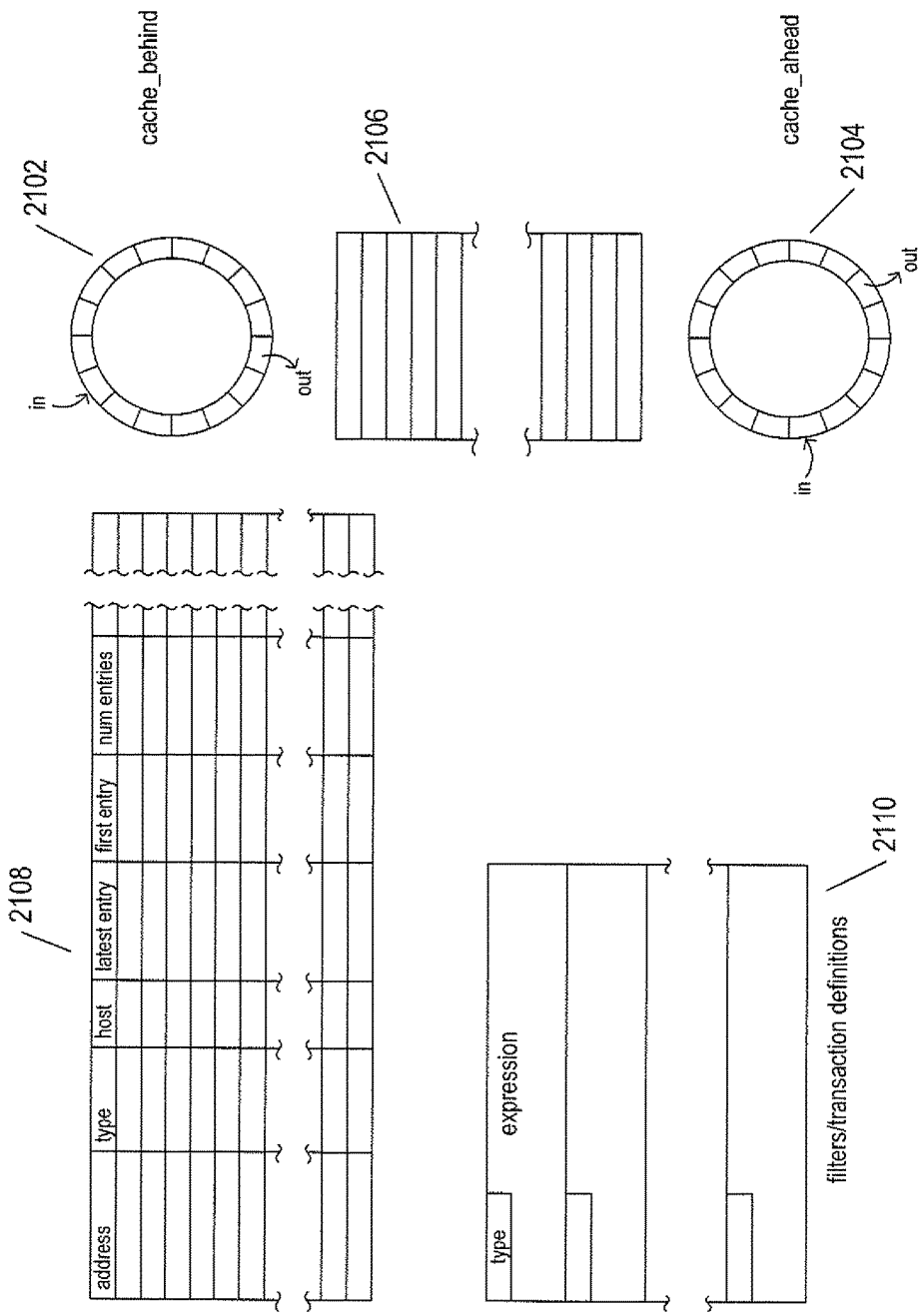
FIG. 21 illustrates certain of the data structures used in an implementation of the virtual-log-file system described below.

FIG. 21 illustrates certain of the data structures used in an implementation of the virtual-log-file system described below. As discussed above with reference to FIGS. 18A and 20A-F, these data structures include a cache behind 2102, a cache ahead 2104, and an in-memory set of virtual-log-file entries 2106. As explained above, the cache behind and cache ahead are logically circular buffers from which entries can be removed and into which entries can be added while preserving the order of the entries within the circular buffer. These caches may be additional memories or other types of data-storage devices. The virtual-log-file system displays virtual-log-file entries from those entries stored in memory 2106. Scrolling operations that exceed the limits of the memory therefore involve moving entries from cache to memory and from memory to cache, as discussed above. The data structures also include a table 2108 of physical log files, or log-file-entry sources, within a distributed computer system. Each row in the table represents a physical log file or source of log-file entries. These physical log files may be described a variety of different types of fields, including an address, type, host identifier, indications of the number of entries currently residing in the log file, and indications of the earliest and latest entry currently residing in the log file. Many other types of fields are possible. A final data structure 2110 includes entries that contain the various filters and transaction definitions that are currently used for processing collected log-file entries in order to generate the virtual log file.

Figure 22A:
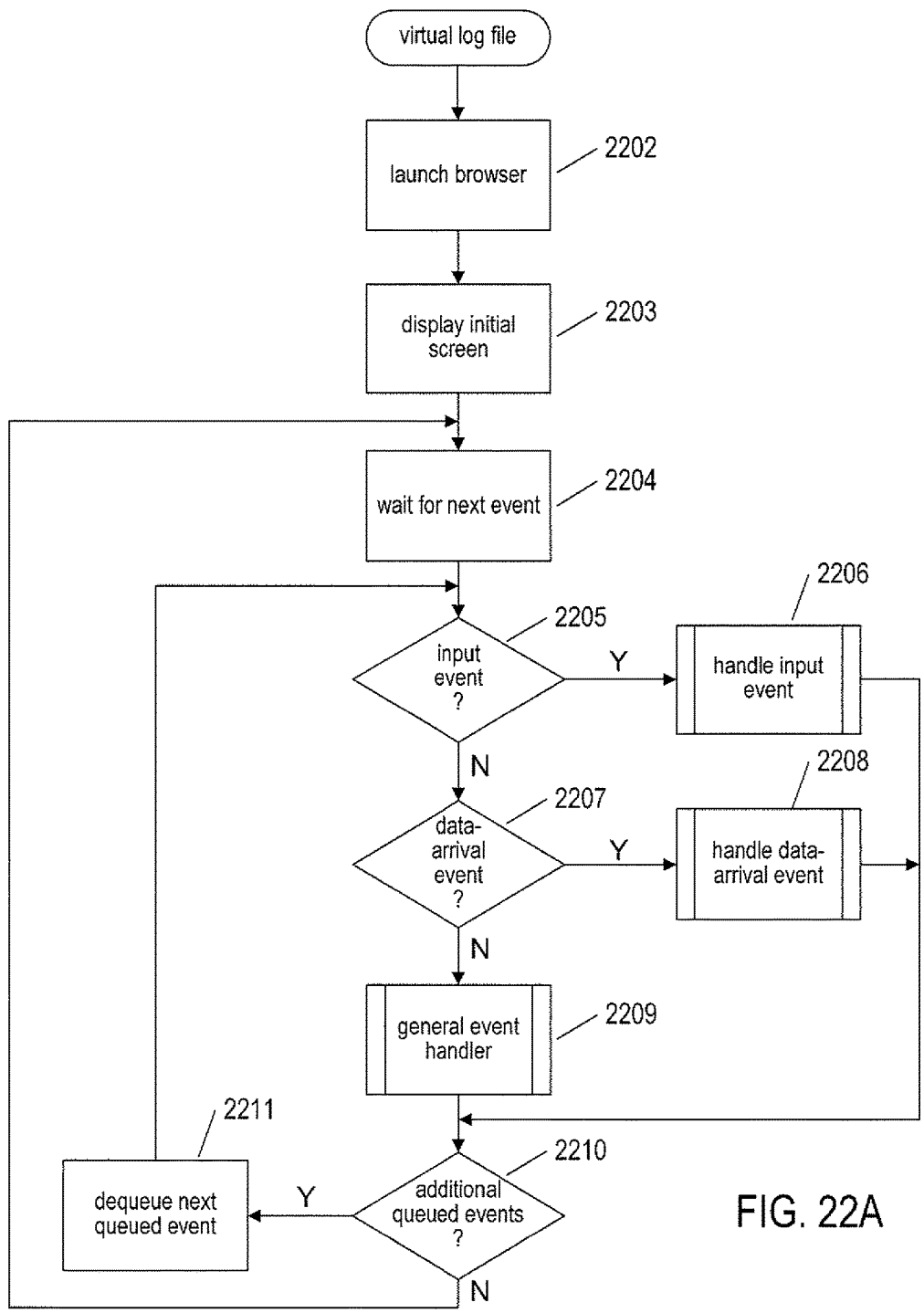
FIGS. 22A-J provide control-flow diagrams that illustrate one implementation of a virtual-log-file system according to the current application.

FIGS. 22A-J provide control-flow diagrams that illustrate one implementation of a virtual-log-file system according to the current application. FIG. 22A provides a control-flow diagram for the highest-level logic of the virtual-log-file system. In step 2202, a virtual-log-file application, or browser, is launched on a user computer, as discussed above with reference to FIG. 18B. In step 2203, an initial screen is displayed to the user. This allows the user to input the various parameters needed to generate a virtual log file. Then, in the continuous loop of steps 2204-2211, the virtual-log-file application enters a continuous event loop in which the application waits for a next event and handles the event. When the next event is an input event, as determined in step 2205, then an input-event handler is called in step 2206. When the next-occurring event is a data-arrival event, as determined in step 2207, then a handler for data-arrival events is called in step 2208. Otherwise, a general event handler is invoked in step 2209 to handle other types of events which may occur, including various types of errors, hardware events, and other such events. Once the next-occurring event is handled, when there are any additional queued events, as determined in step 2210, a next queued event is dequeued, in step 2211, and control flows back to step 2205. Otherwise, control flows back to step 2204, where the virtual-log-file application waits for the occurrence of a next event.

Figure 22B:
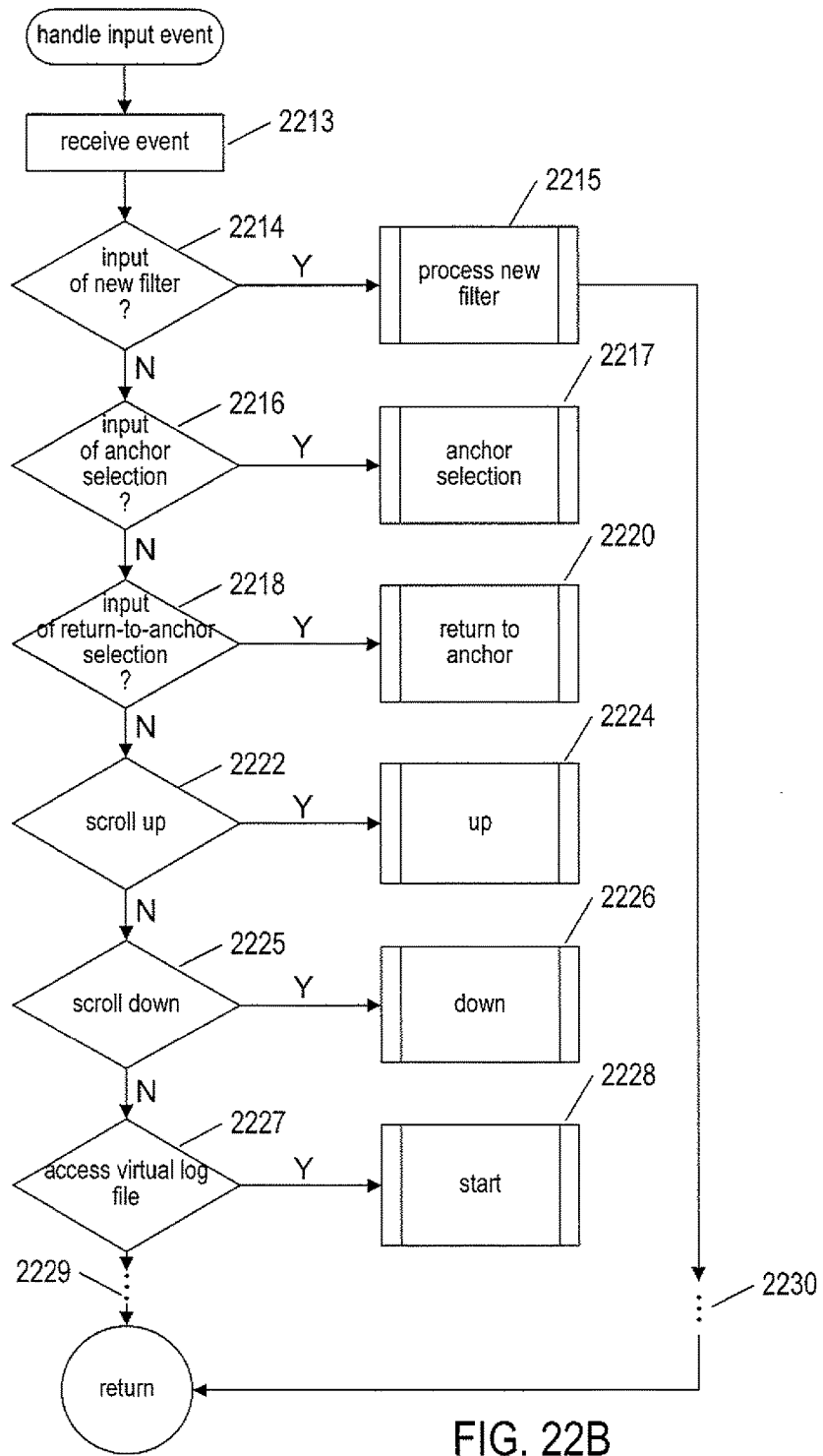

FIG. 22B provides a control-flow diagram for the routine "handle input event," called in step 2206 of FIG. 22A. FIG. 22B provides details for handling a portion of the many different types of input events that may occur. In step 2213, the routine receives an event for handling. When the event is an input of a new filter through a filter-addition input feature, as determined in step 2214, then the routine "process new filter" is called in step 2215. When the input event is input of an anchor selection, as determined in step 2216, then the routine "anchor selection" is called in step 2217. When the input event is input of a return-to-anchor input selection, as determined in step 2218, then the routine "return to anchor" is called in step 2220. When the received input event is a scroll-up event, as determined in step 2222, then the routine "up" is called in step 2224. When the input event is a scroll-down input, as determined in step 2225, then, in step 2226, the routine "down" is called. When the input event is an input, by the user, directing the virtual-log-file application to generate a virtual log file for display based on filters and other parameters input by the user, as determined in step 2227, then the routine "start" is called in step 2228. Ellipses 2229 and 2230 indicate that there are many additional types of input events that are handled by the virtual-log-file application.

Figure 22C:
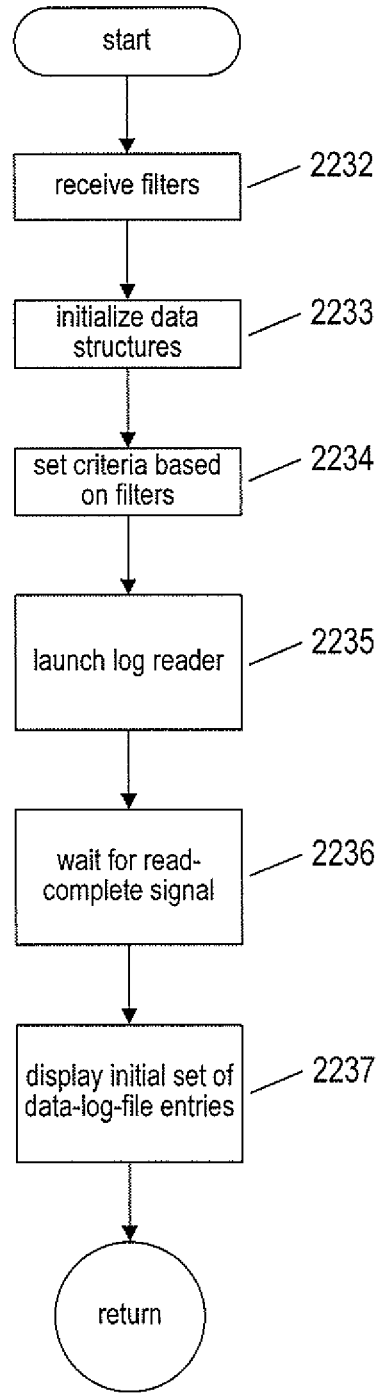

FIG. 22C provides a control-flow diagram for the routine "start," called in step 2228 of FIG. 22B. In step 2232, the routine "start" receives the current filters or accesses the current filters in order to prepare for processing of collected log-file entries. In step 2233, the routine "start" initializes the various virtual-log-file data structures, such as the caches and memory 2102, 2104, and 2106. In step 2234, the routine "start" sets selection criteria for log-file entries based on the filters. This may involve generating a routine based on a complex Boolean expression, in certain implementations, or formatting a Boolean expression for use by log-file-entry collection routines. In step 2235, the routine "start" launches a log reader that runs asynchronously. In step 2236, the routine "start" waits for a read-complete signal to be generated by the log reader. In step 2237, the routine "start" displays an initial set of virtual-log-file entries to the user in the display window.

Figure 22D:
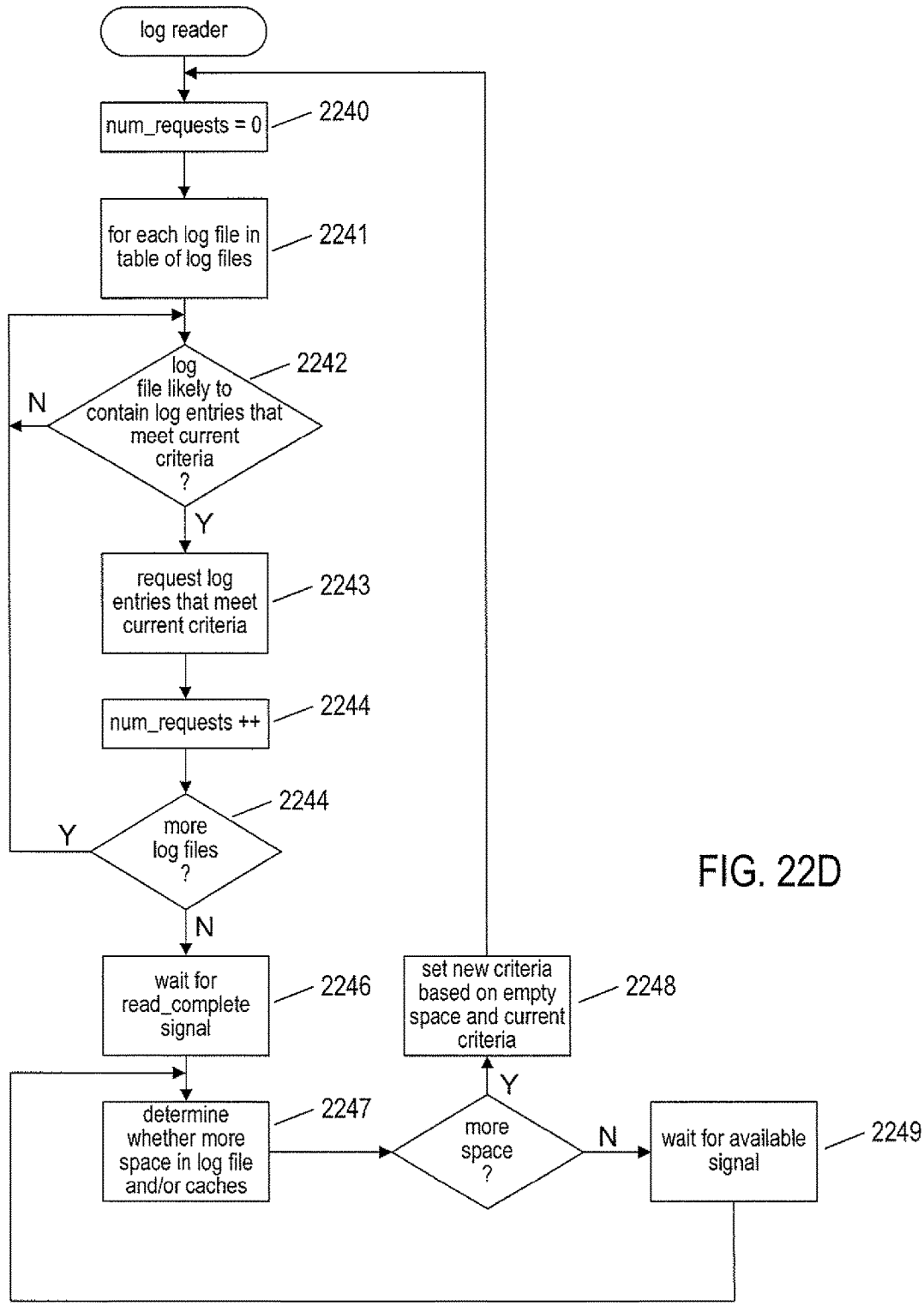

FIG. 22D provides a control-flow diagram for the asynchronous log reader, launched in step 2235 in FIG. 22C. In step 2240, the log reader sets a local variable num_requests to 0. Then, in the for-loop of steps 2241-2245, the log reader considers each entry in the table of log files (2108 in FIG. 21). If the log reader determines that the physical log file likely contains log entries that meet the current criteria for selection, as determined in step 2242, then, in step 2243, the log reader sends a request to a remote computer containing the physical log file to extract and return physical-log-file entries that meet the current criteria for inclusion in the virtual log file. In step 2244, the local variable num_requests is incremented. If there are more log files to consider, as determined in step 2245, control returns to step 2242. Otherwise, in step 2246, the log reader waits for a read-_complete signal. In step 2247, the log reader determines whether or not there is more space in the in-memory portion of the virtual log file and/or the virtual-log-file caches. If so, then new criteria for selection of physical-log-file entries for inclusion in the virtual log file are determined based on the amount of empty space and the current criteria, in step 2248, and control then returns to step 2240 to send out a set of requests for additional log-file entries. Otherwise, in step 2249, the log reader waits for an available signal that indicates that more space may be available for including physical-log-file entries in the virtual log file.

Figure 22E:
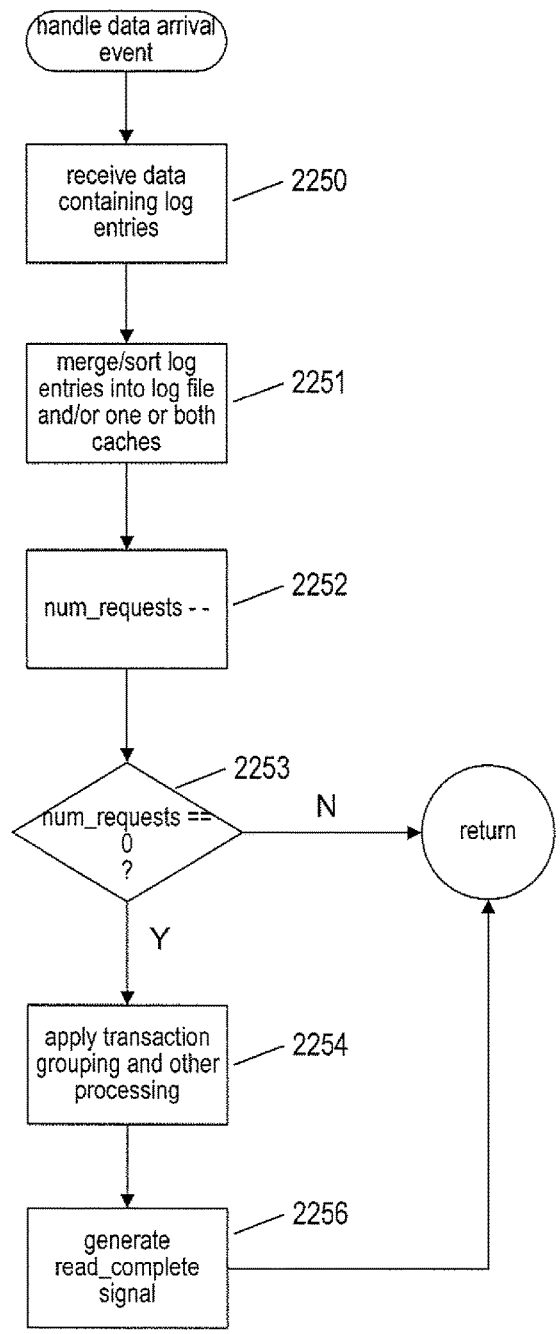

FIG. 22E provides a control-flow diagram for the routine "handle data-arrival event" called in step 2208 of FIG. 22A. In step 2250, the routine "handle data-arrival event" receives data from a remote computer that contains requested log entries. In step 2251, the received log entries are added to the virtual log file via merge/sort operations. In step 2252, the global variable "num_requests" is decremented. When the value stored in the global variable "num_requests" is 0, as determined in step 2253, then transaction grouping and other processing is applied to the virtual log file, in step 2254, and a read_complete signal is generated in step 2256.

Figure 22F:
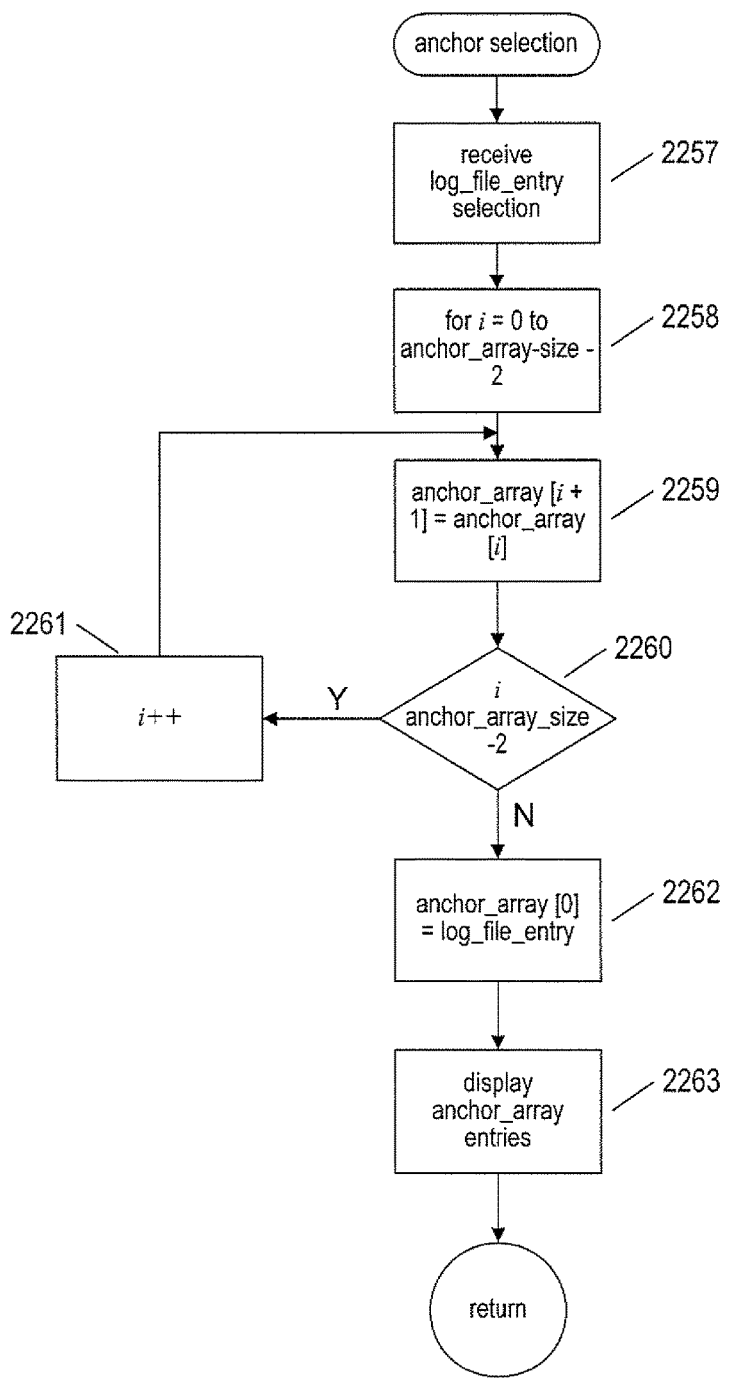

FIG. 22F provides a control-flow diagram for the routine "anchor selection" called in step 2217 of FIG. 22B. In step 2257, the routine "anchor selection" receives a log-file-entry selection generated as a result of input by the user to an input feature of the displayed virtual log file. In the for-loop of steps 2258-2261, the contents of an anchor array are moved down, by one cell, and then, in step 2262, the first entry in the anchor array is set to refer to the virtual-log-file entry selected as a new anchor by the user. In step 2263, the current contents of the anchor array are redisplayed to the user.

Figure 22G:
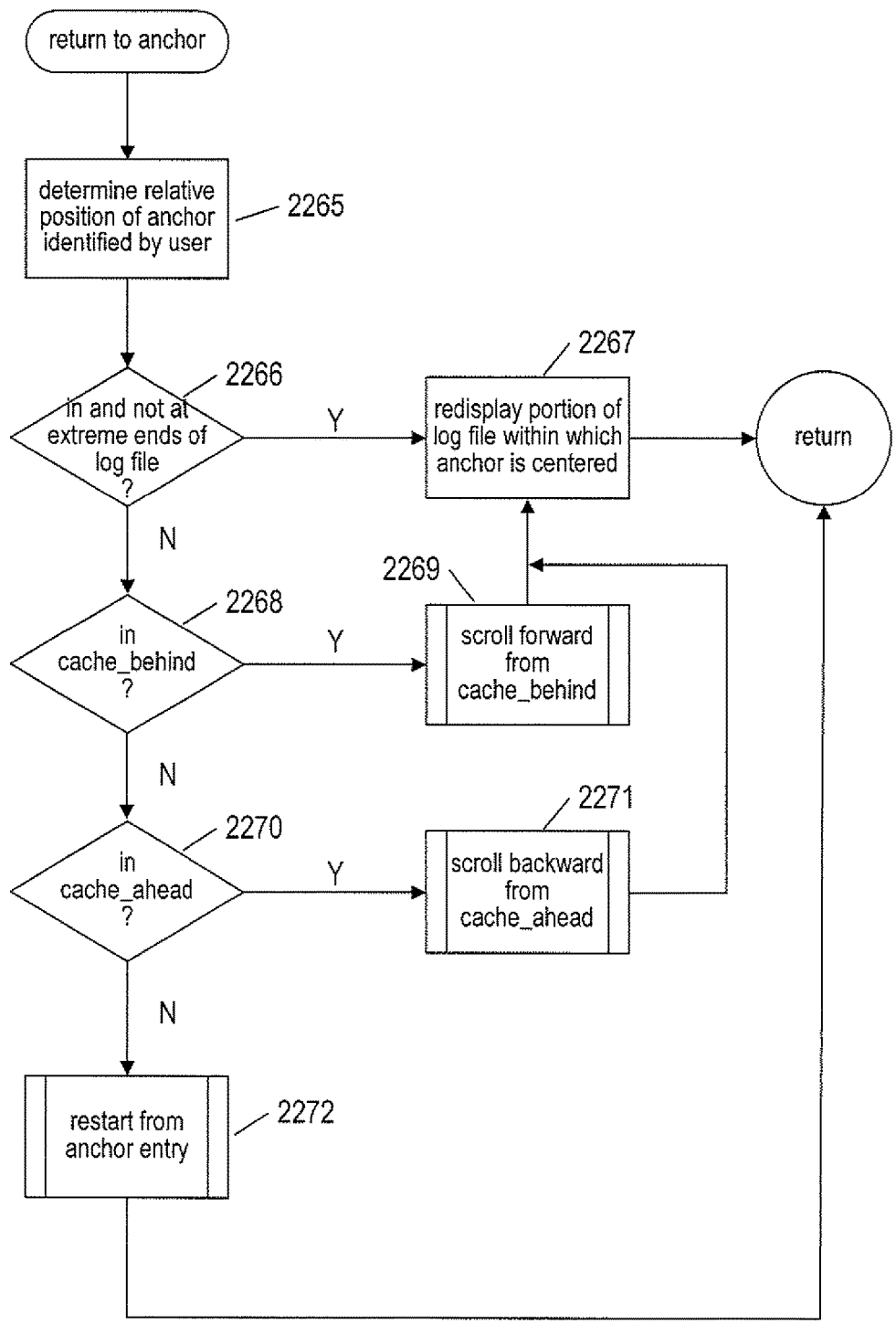

FIG. 22G provides a control-flow diagram for the routine "return to anchor," called in step 2220 in FIG. 22B. In step 2265, the routine "return to anchor" determines the relative position of the anchor identified by the user to which the user wishes to return the display window within the virtual log file. When the anchor entry selected by the user is in the in-memory portion of the virtual log file and not at the extreme ends of the virtual log file, as determined in step 2266, then, in step 2267, the routine "return to anchor" redisplays the portion of the virtual log file within which the anchor entry is centered to the user. Otherwise, when the anchor entry is in the cache behind, as determined in step 2268, then a scroll-forward routine is called, in step 2269, to scroll the virtual log file forward in order to place the selected anchor entry back into the in-memory portion of the virtual log file, after which control flows to step 2267. When the anchor entry is in the cache ahead, as determined in step 2270, then a scroll-backward routine is called, in step 2271, to scroll the virtual log file backward in order to place the anchor entry into the in-memory portion of the virtual log file. Control then flows to step 2267. Otherwise, in step 2272, the routine "return to anchor" restarts the virtual log file based on the selected anchor entry, which involves beginning the process of collecting and processing log entries from the distributed computer system again.

Figure 22H:
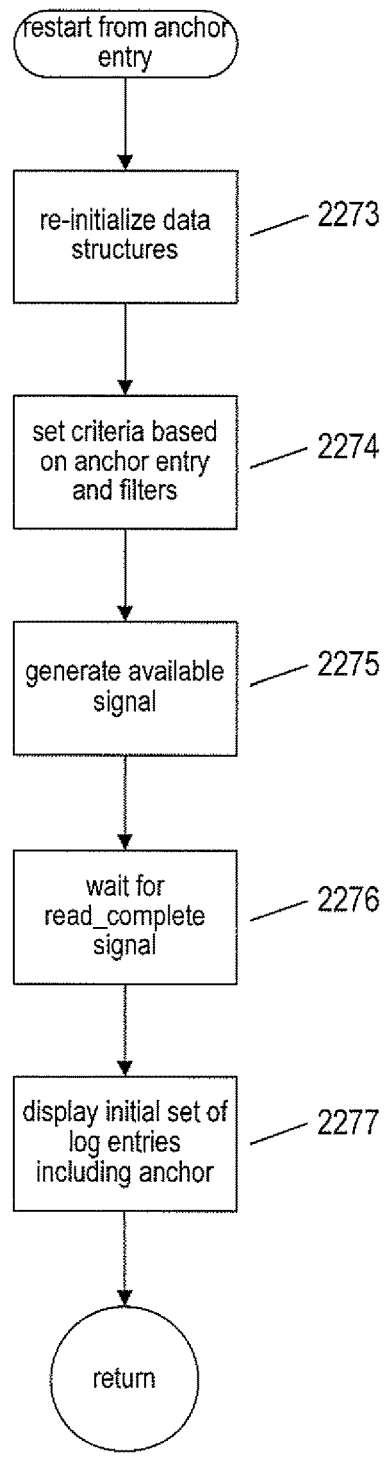

FIG. 22H provides a control-flow diagram for the routine "restart from anchor entry," called in step 2272 of FIG. 22G. In 2273, the routine reinitializes the data structures and then, in step 2274, sets acceptance criteria for log entries based on the anchor entry and current filters. In step 2275, the routine generates an available signal and then, in step 2276, waits for a read_complete signal before displaying an initial set of virtual-log-file entries that include the anchor entry in the display window, in step 2277.

Figure 22I:
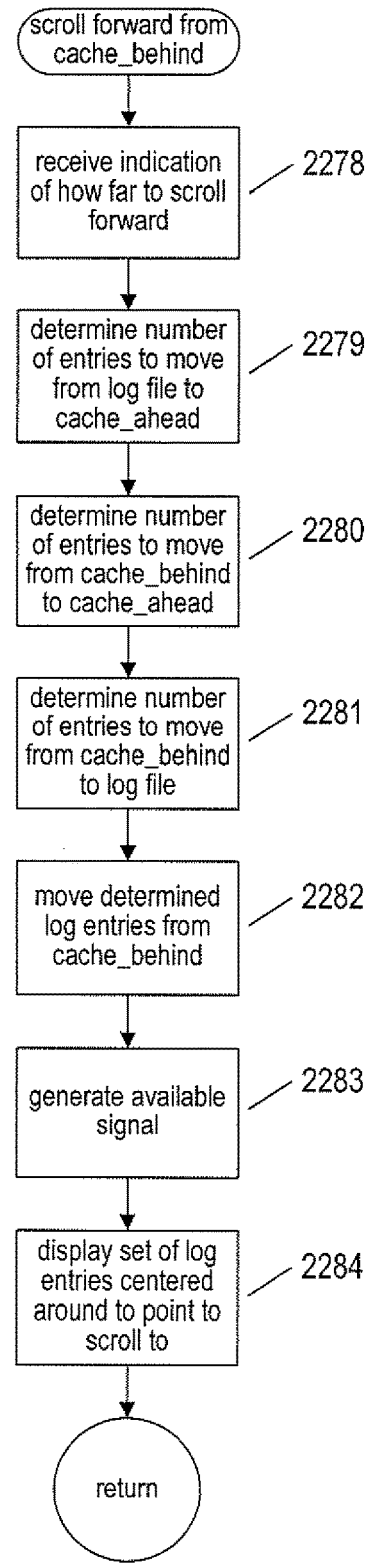

FIG. 22I provides a control-flow diagram for the scroll-forward routine called in step 2269 of FIG. 22G. In step 2278, the routine receives an indication of how far to scroll forward in the virtual log file. This indication may be the sequence number associated with an anchor entry or a number of log entries provided by a scrolling input to the virtual-log-file application. In step 2279, the routine determines, based on how far the routine needs to scroll forward, the number of entries to move from the in-memory portion of the virtual log file to the cache ahead. In step 2280, the routine determines the number of entries that need to be moved from the cache behind to the cache ahead. In step 2281, the routine determines the number of entries that need to be moved from the cache behind to the in-memory portion of the log file. Then, in step 2282, the routine moves the determined number of log entries from the cache behind to the cache ahead and in-memory portion of the virtual log file. In step 2283, the routine generates an available signal and, in step 2284, displays to the user a set of log entries centered around the point in the virtual log file to which the display window has been scrolled.

Figure 22J:
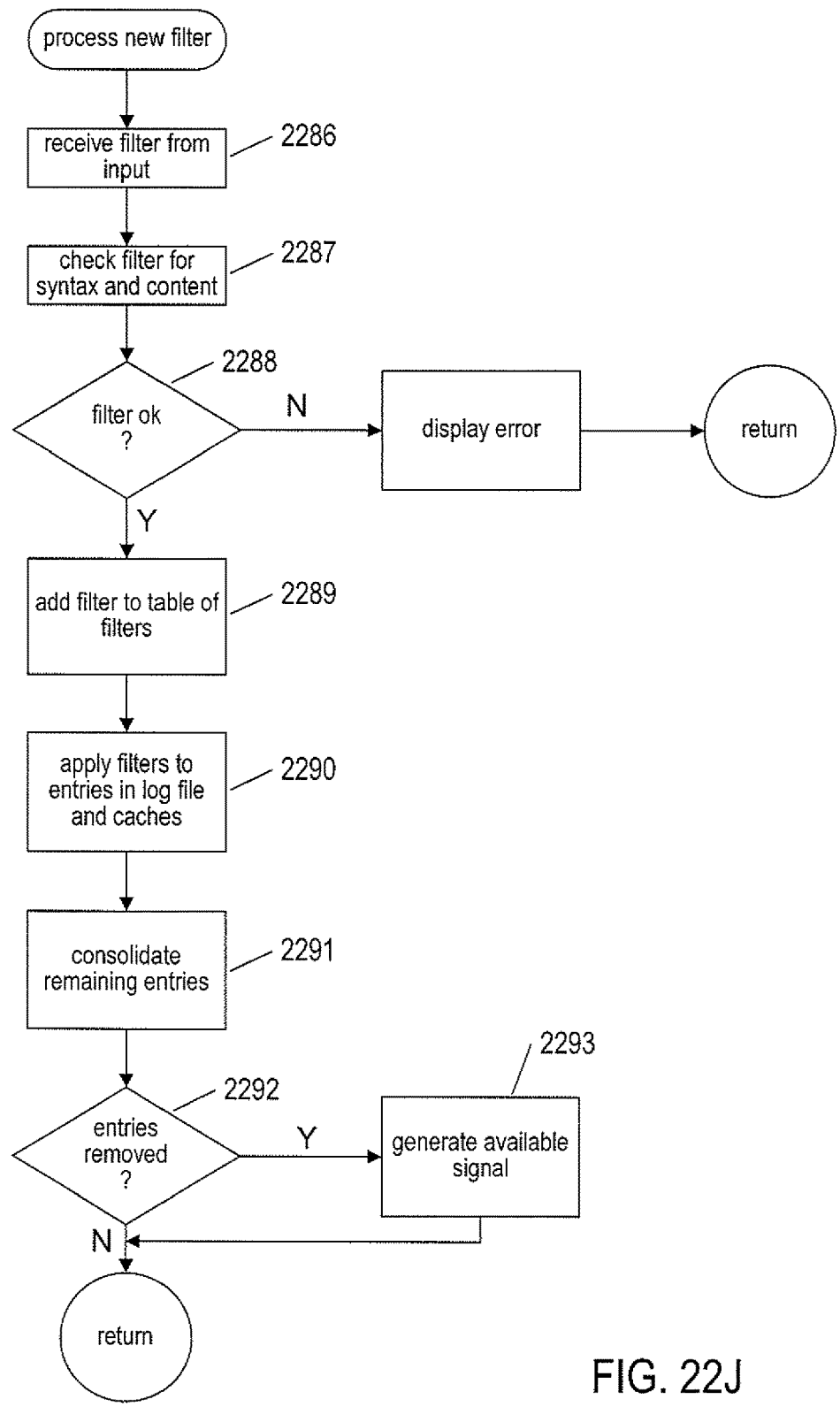

FIG. 22J provides a control-flow diagram for the routine "process new filter," called in step 2215 of FIG. 22B. In step 2286, the routine "process new filter" receives a new filter input by a user. In step 2287, the routine checks the filter for syntax and content to ensure that the filter has been properly specified. When the filter is properly specified, as determined in step 2288, then the filter is added to the table of filters (2110 in FIG. 21) in step 2289. In step 2290, the current filters are applied to the entries in the virtual log file, including the in-memory portion of the virtual log file and the cache ahead and cache behind. Those entries accepted by the filters are then consolidated within the virtual log file in step 2291. When application of the filters, in step 2290, has removed entries from the virtual log file, as determined in step 2292, then the routine "process new filter" generates an available signal in step 2293.

Although the present invention has been described in terms of particular embodiments, it is not intended that the invention be limited to these embodiments. Modifications within the spirit of the invention will be apparent to those skilled in the art. For example, any of many different design and implementation parameters may be varied to produce alternative implementations of the virtual-log-file system, including choice of operating system and virtualization, programming language, hardware platform, modular organization, control structures, data structures, and other such parameters. Any number of anchor entries may be selected and concurrently maintained, with certain implementations providing additional scrolling and visualization features to allow users to rapidly view and select particular anchor entries. In certain implementations, rather than using complex buffering schemes, scrolling operations are supported by real-time acquisition of log-file entries from the various log files present within a system. A wide variety of different types of features may be provided to allow users to customize the appearance of displayed virtual-log-file entries, including the ability to define various additional computed fields that allow two or more underlying fields of log-file entries to be merged, reordered, or otherwise altered. In certain implementations, virtual-log-file entries may be color coded according to values or ranges of values of selected virtual-log-file-entry fields. In more complex implementations, the virtual log file may be continuously or intermittently updated as log-file entries are continuously acquired from log files within one or more computer systems. While the virtual-log-file system has particular utility for visually displaying log-file entries collected from complex, distributed computer systems, the virtual-log-file system also provides significant benefit to viewers of even single log files obtained from single computer systems. In certain implementations, scrolling wrap-around is provided, so that, for example, scrolling backward past the first virtual-log-file entry begins display of the most recently obtained virtual-log-file entries.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A virtual-log-file system comprising:
   one or more processors;
   one or more memories; and
   computer instructions, stored in one or more of the one or more memories that, when executed by one or more of the one or more processors, control the virtual-log-file system to
   request and receive physical log-file entries from local and remote physical log files by
       accessing stored information that includes local file-system locations and/or network addresses of the local and remote physical log files;
       accessing stored filter information to obtain one or more filters that are applied to log-file entries of the local and remote physical log files to select physical log-file entries to request from the local and remote physical log files; and
       using the one or more filters and the local file-system locations and/or network addresses to request and receive physical log-file entries that each passes a filter applied to the contents of the physical log-file entries,
   aggregate the received physical log-file entries into a virtual log file, a portion of which is stored in one or more of the one or more memories,
   display a portion of the virtual-log-file entries contained within a logical display window on a display device, and
   receive inputs that direct the virtual-log-file system to
       scroll the logical display window backwards and forwards along the sequence of virtual-log-file entries, the virtual-log-file system obtaining additional physical log-file entries to place in memory when scrolling moves the logical display window past the virtual-log-file entries currently stored in the one or more of the one or more memories,
       select one or more virtual-log-file entries as anchor virtual-log-file entries and store a reference to each of the one or more selected anchor virtual-log-file entries, and
       direct repositioning of the logical display window to display a selected anchor virtual-log-file entry using the stored reference to the anchor virtual-log-file entry.

2. The virtual-log-file system of claim 1 wherein one or more of the one or more filters is additionally applied to each of the local file-system locations and/or network addresses of the local and remote physical log files in order to request and receive physical log-file entries from a subset of the local and remote physical log files.

3. The virtual-log-file system of claim 1 wherein each of the one or more filters includes Boolean logic that produces one of a Boolean value or a signal when a physical log-file entry is input to the Boolean logic to indicate whether or not the physical log-file entry is included in the virtual log file.

4. The virtual-log-file system of claim 1 wherein the virtual log file additionally includes one or more cache components that buffer virtual-log-file entries for input to the portion of the virtual log file stored in one or more of the one or more memories and that receive virtual-log-file entries removed from the portion of the virtual log file stored in one or more of the one or more memories to facilitate scrolling of the logical display window over the virtual-log-file entries.

5. The virtual-log-file system of claim 1 wherein the received physical log-file entries are asynchronously aggregated into the virtual log file while a portion of the virtual-log-file entries within the logical display window are displayed on a display device.

6. The virtual-log-file system of claim 1 wherein repositioning of the logical display window to display a selected anchor virtual-log-file entry further includes:
  when the anchor virtual-log-file entry is not located in the portion of the virtual log file stored in one or more of the one or more memories, scrolling the virtual log file to place the anchor virtual-log-file entry into the portion of the virtual log file stored in one or more of the one or more memories and then repositioning of the logical display window to include the anchor virtual-log-file entry.

7. The virtual-log-file system of claim 1 wherein the virtual-log-file entries are ordered according to the values of one or more virtual-log-file-entry parameters.

8. The virtual-log-file system of claim 1 wherein the virtual-log-file system additionally receives inputs that direct the virtual-log-file system to add filters.

9. The virtual-log-file system of claim 1 wherein an added filter is immediately applied to the virtual log file to remove virtual-log-file entries that are rejected by the added filter from display.

10. The virtual-log-file system of claim 1 wherein the virtual-log-file system additionally receives inputs that direct the virtual-log-file system to choose different display colors for the backgrounds of different types of virtual-log-file entries.

11. The virtual-log-file system of claim 1 wherein the virtual-log-file system additionally receives inputs that direct the virtual-log-file system to reorder virtual-log-file entries.

12. The virtual-log-file system of claim 1 wherein the virtual-log-file system additionally receives inputs that direct the virtual-log-file system to highlight virtual-log-file entries of particular types.

13. A method for creating and displaying a virtual log file by a virtual-log-file system comprising one or more processors, one or more memories, and computer instructions, stored in one or more of the one or more memories that, when executed by one or more of the one or more processors, control the virtual-log-file system, the method comprising:
  requesting and receiving physical log-file entries from local and remote physical log files by
    accessing stored information that includes local file-system locations and/or network addresses of the local and remote physical log files;
    accessing stored filter information to obtain one or more filters that are applied to log-file entries of the local and remote physical log files to select physical log-file entries to request from the local and remote physical log files; and
    using the one or more filters and the local file-system locations and/or network addresses to request and receive physical log-file entries that each passes a filter applied to the contents of the physical log-file entries;
  aggregating the received physical log-file entries into a virtual log file, a portion of which is stored in one or more of the one or more memories;
  displaying a portion of the virtual-log-file entries contained within a logical display window on a display device; and
  in response to inputs to the virtual-log-file system,
    scrolling the logical display window backwards and forwards along the sequence of virtual-log-file entries, obtaining additional physical log-file entries to place in memory when scrolling moves the logical display window past the virtual-log-file entries currently stored in the one or more of the one or more memories,
    selecting one or more virtual-log-file entries as anchor virtual-log-file entries and storing a reference to each of the one or more selected anchor virtual-log-file entries, and
    directing repositioning of the logical display window to display a selected anchor virtual-log-file entry using the stored reference to the anchor virtual-log-file entry.

14. The method of claim 13 wherein the virtual log file additionally includes one or more cache components that buffer virtual-log-file entries for input to the portion of the virtual log file stored in one or more of the one or more memories and that receive virtual-log-file entries removed from the portion of the virtual log file stored in one or more of the one or more memories to facilitate scrolling of the logical display window over the virtual-log-file entries.

15. The method of claim 13 further including:
  asynchronously aggregating the received physical log-file entries into the virtual log file while displaying a portion of the virtual-log-file entries within the logical display window on a display device.

16. The method of claim 13 wherein repositioning of the logical display window to display a selected anchor virtual-log-file entry further includes:
  when the anchor virtual-log-file entry is not located in the portion of the virtual log file stored in one or more of the one or more memories, scrolling the virtual log file to place the anchor virtual-log-file entry into the portion of the virtual log file stored in one or more of the one or more memories and then repositioning of the logical display window to include the anchor virtual-log-file entry.

17. The method of claim 13
  wherein the virtual-log-file entries are ordered according to the values of one or more virtual-log-file-entry parameters;
  wherein the virtual-log-file system additionally receives inputs that direct the virtual-log-file system to add filters; and wherein an add filter is immediately applied to the virtual log file to remove virtual-log-file entries that are rejected by the added filter from display.

18. The method of claim 13
wherein the virtual-log-file system additionally receives inputs that direct the virtual-log-file system to choose different display colors for the backgrounds of different types of virtual-log-file entries;
wherein the virtual-log-file system additionally receives inputs that direct the virtual-log-file system to reorder virtual-log-file entries; and
wherein the virtual-log-file system additionally receives inputs that direct the virtual-log-file system to highlight virtual-log-file entries of particular types.

19. A physical data-storage device that stores computer instructions that, when executed by a virtual-log-file system comprising one or more processors and one or more memories, control the virtual-log-file system to create and display a virtual log file by:
    requesting and receiving physical log-file entries from local and remote physical log files by
        accessing stored information that includes local file-system locations and/or network addresses of the local and remote physical log files;
        accessing stored filter information to obtain one or more filters that are applied to log-file entries of the local and remote physical log files to select physical log-file entries to request from the local and remote physical log files; and
        using the one or more filters and the local file-system locations and/or network addresses to request and receive physical log-file entries that each passes a filter applied to the contents of the physical log-file entries;
    aggregating the received physical log-file entries into a virtual log file, a portion of which is stored in one or more of the one or more memories;
    displaying a portion of the virtual-log-file entries contained within a logical display window on a display device; and
    in response to inputs to the virtual-log-file system,
        scrolling the logical display window backwards and forwards along the sequence of virtual-log-file entries, obtaining additional physical log-file entries to place in memory when scrolling moves the logical display window past the virtual-log-file entries currently stored in the one or more of the one or more memories,
        selecting one or more virtual-log-file entries as anchor virtual-log-file entries and storing a reference to each of the one or more selected anchor virtual-log-file entries, and
        directing repositioning of the logical display window to display a selected anchor virtual-log-file entry using the stored reference to the anchor virtual-log-file entry.

* * * * *